United States Patent
Kim et al.

(10) Patent No.: US 11,084,423 B2
(45) Date of Patent: Aug. 10, 2021

(54) APPARATUS FOR PROVIDING AROUND VIEW

(71) Applicant: LG INNOTEK CO., LTD., Seoul (KR)

(72) Inventors: Dong Gyun Kim, Seoul (KR); Sung Hyun Lim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 105 days.

(21) Appl. No.: 16/476,948

(22) PCT Filed: Jan. 12, 2018

(86) PCT No.: PCT/KR2018/000643
§ 371 (c)(1),
(2) Date: Jul. 10, 2019

(87) PCT Pub. No.: WO2018/131949
PCT Pub. Date: Jul. 19, 2018

(65) Prior Publication Data
US 2019/0351824 A1    Nov. 21, 2019

(30) Foreign Application Priority Data

Jan. 13, 2017  (KR) .................. 10-2017-0006432

(51) Int. Cl.
*G06K 9/00*      (2006.01)
*B60R 1/00*      (2006.01)
(Continued)

(52) U.S. Cl.
CPC .............. *B60R 1/00* (2013.01); *B60W 50/14* (2013.01); *G06K 9/00805* (2013.01);
(Continued)

(58) Field of Classification Search
CPC ......... G06T 3/4038; G06T 2207/30252; G06T 15/205; G06T 1/00; G06T 2207/20221;
(Continued)

(56) References Cited

U.S. PATENT DOCUMENTS

2007/0268118 A1* 11/2007 Watanabe ................ B60R 1/00
                                                              340/435
2010/0172585 A1*  7/2010 Murashita ............. H04N 5/265
                                                              382/168
(Continued)

FOREIGN PATENT DOCUMENTS

JP      2007-104373         4/2007
JP      2007104373 A  *     4/2007
(Continued)

OTHER PUBLICATIONS

International Search Report dated Apr. 10, 2018 issued in Application No. PCT/KR2018/000643.
(Continued)

*Primary Examiner* — Guillermo M Rivera-Martinez
(74) *Attorney, Agent, or Firm* — KED & Associates LLP

(57) ABSTRACT

An apparatus for providing an around view comprises: first and second cameras for acquiring first and second image information; and a processor. The processor can generate an around view image including a first area including a subject overlapping area and a second area excluding the subject overlapping area, on the basis of first and second images. The subject overlapping area is disposed between first and second boundary lines in the first and second images. The first boundary line is located in the first area, and the second boundary line adjoins the second area. If it is predicted that a first object will pass through the second boundary line due to the first object approaching within a predetermined distance thereto, the processor can generate an around view image in which the second area is changed so that the second area includes the subject overlapping area.

16 Claims, 26 Drawing Sheets

(51) Int. Cl.
  *G06T 7/292* (2017.01)
  *B60W 50/14* (2020.01)

(52) U.S. Cl.
  CPC ........ *G06T 7/292* (2017.01); *B60R 2300/102* (2013.01); *B60R 2300/105* (2013.01); *B60R 2300/303* (2013.01); *B60R 2300/802* (2013.01); *B60W 2050/143* (2013.01); *B60W 2050/146* (2013.01); *G06T 2207/30261* (2013.01)

(58) Field of Classification Search
  CPC ........... G06T 7/292; G06T 7/55; G06T 7/579; G06K 9/00805; G06K 2009/2045
  See application file for complete search history.

(56) References Cited

U.S. PATENT DOCUMENTS

| | | | | |
|---|---|---|---|---|
| 2010/0220190 | A1* | 9/2010 | Hiroshi | B60R 1/00 348/148 |
| 2011/0285848 | A1* | 11/2011 | Han | B60R 1/00 348/148 |
| 2013/0286205 | A1* | 10/2013 | Okada | G06K 9/00805 348/148 |
| 2014/0002660 | A1* | 1/2014 | Takahashi | B60R 1/00 348/148 |
| 2014/0152827 | A1* | 6/2014 | Yamamoto | G06T 3/4038 348/148 |
| 2014/0218531 | A1* | 8/2014 | Michiguchi | G06K 9/00791 348/148 |
| 2014/0247352 | A1* | 9/2014 | Rathi | G06K 9/00791 348/148 |
| 2015/0130942 | A1* | 5/2015 | Fujita | B60R 1/00 348/148 |
| 2015/0258935 | A1* | 9/2015 | Nagata | H04N 7/181 348/148 |
| 2015/0281594 | A1* | 10/2015 | Sakaniwa | H04N 5/265 348/218.1 |
| 2016/0159281 | A1* | 6/2016 | Jang | B60R 1/00 348/148 |
| 2016/0165148 | A1* | 6/2016 | Itoh | H04N 5/247 348/148 |
| 2017/0096106 | A1* | 4/2017 | Higuchi | B60R 1/00 |
| 2020/0320728 | A1* | 10/2020 | Tsunashima | G01S 11/12 |

FOREIGN PATENT DOCUMENTS

| | | |
|---|---|---|
| JP | 5500877 | 5/2014 |
| KR | 10-2012-0130456 | 12/2012 |
| KR | 10-2013-0135537 | 12/2013 |
| KR | 10-1567405 | 11/2015 |
| KR | 101567405 B1 * | 11/2015 |
| KR | 10-2016-0089222 | 7/2016 |

OTHER PUBLICATIONS

European Search Report dated Oct. 20, 2020 issued in Application No. 18739022.4.

* cited by examiner

APPARATUS FOR PROVIDING AROUND VIEW

CROSS-REFERENCE TO RELATED PATENT APPLICATIONS

This application is a U.S. National Stage Application under 35 U.S.C. § 371 of PCT Application No. PCT/KR2018/000643, filed Jan. 12, 2018, which claims priority to Korean Patent Application No. 10-2017-0006432, filed Jan. 13, 2017, whose entire disclosures are hereby incorporated by reference.

TECHNICAL FIELD

The present invention relates to an apparatus for providing an around view.

BACKGROUND ART

A vehicle refers to a device that drives a wheel for the purpose of transporting people or cargo. A typical example of the vehicle is a car.

According to a prime mover used, vehicles are classified into an internal combustion engine vehicle, an external combustion engine vehicle, a gas turbine vehicle, an electric vehicle, etc.

The electric vehicle refers to a vehicle that drives an electric motor by using electricity as an energy source, and may be classified into a pure electric vehicle, a hybrid electric vehicle (HEV), a plug-in hybrid electric vehicle (PHEV), a fuel cell electric vehicle (FCEV), and the like.

Recently, an intelligent vehicle (Smart Vehicle) has been actively developed and commercialized for safety or convenience of a driver and a pedestrian. The intelligent vehicle is a high-tech vehicle integrated with information technology (IT), in which an advanced system is introduced into the intelligent vehicle to provide an optimal transportation efficiency through interworking with an intelligent transportation system. Specifically, the intelligent vehicle performs the automatic cruise control, adaptive cruise control (ACC), obstacle detection, collision detection, precise map provision, route setting to destination, and guidance for main locations, thereby maximizing the safety and convenience of drivers, passengers and pedestrians.

As one of devices for maximizing the safety and convenience of the drivers, passengers, and pedestrians, an apparatus for providing an around view is spotlighted.

The around view providing apparatus provides an around view image around the vehicle using a camera, and the driver can view around the vehicle in real time through the around view image.

Since the around view image is generated by synthesizing images acquired from mutually different directions, a boundary may exist between adjacent images.

However, according to a conventional around view providing apparatus, when a pedestrian, a dangerous object, or the like is located at such a boundary, the pedestrian, the dangerous object, or the like is overlapped or disappears from the around view image, so that the driver may not recognize the pedestrian or the dangerous object, thereby causing an accident to the pedestrian or the vehicle.

Technical Problem

An object of the present invention is to solve the above problem and other problems.

Another object of the present invention is to provide an apparatus and a method for providing an around view, capable of preventing an object from disappearing or overlapping in an around view image under any circumstances, and a vehicle including the same.

Technical Solution

In order to accomplish the above object and another object, according to one aspect of the present invention, there is provided an apparatus for providing an around view, which includes first and second cameras configured to acquire first and second image information; and a processor. The processor generates an around view image including a first area including a subject overlapping area and a second area excluding the subject overlapping area based on first and second images. The subject overlapping area is disposed between first and second boundary lines in the first and second images, the first boundary line is located in the first area, and the second boundary line adjoins the second area. The processor generates the around view image in which the second area is changed to include the subject overlapping area, when it is predicted that a first object passes through the second boundary line due to an approach of the first object within a predetermined distance.

According to another aspect of the present invention, there is provided an apparatus for providing an around view, which includes first and second cameras configured to acquire first and second images; and a processor.

The processor may generate an around view image including a first synthesis area including an overlapping area and a second synthesis area excluding the overlapping area based on the acquired first and second images, and when it is predicted that a first object passes through a second boundary line due to an approach of the first object within a predetermined distance, the processor may generate a modulated around view image in which the second synthesis area is enlarged to include the overlapping area. The overlapping area may be located between a first and the second boundary lines, the first boundary line may be located in the first synthesis area and the second boundary line may adjoin the second synthesis area.

According to still another aspect of the present invention, there is provided a vehicle equipped with the apparatus for providing an around view.

According to still another aspect of the present invention, there is provided a method for providing an around view, the method including: generating an around view image including a first synthesis area including an overlapping area and a second synthesis area excluding the overlapping area based on first and second images acquired from first and second cameras, in which the overlapping area is disposed between first and second boundary lines, the first boundary line is located in the first synthesis area, and the second boundary line adjoins the second synthesis area; and when it is predicted that a first object passes through the second boundary line due to an approach of the first object within a predetermined distance, generating a modulated around view image in which the second synthesis area is enlarged to include the overlapping area.

According to still another aspect of the present invention, a recording medium on which a computer-readable program is recorded may be recorded with a program for performing the following method of providing an around view.

The method of providing an around view includes: generating an around view image including a first synthesis area including an overlapping area and a second synthesis area excluding the overlapping area based on first and second images acquired from first and second cameras, respectively; and when it is predicted that an object passes through a second boundary line due to an approach of the object within a predetermined distance, generating a modulated around view image in which the second synthesis area is enlarged to include the overlapping area.

The overlapping area may be disposed between a first and the second boundary lines, the first boundary line may be located in the first synthesis area, and the second boundary line may adjoin the second synthesis area.

Advantageous Effects

Effects of the apparatus for providing an around view according to the present invention are as follows.

According to at least one of the embodiments of the present invention, when an object is located on a specific boundary line of an around view image, a synthesis area adjacent to the specific boundary line is enlarged to include an overlapping area so that the specific boundary line is changed. Thus, the object is not located at the boundary line and the enlarged synthesis area is generated as an image acquired by the same camera to maintain the continuity of the viewpoint. Accordingly, there is an advantage that the object located on the specific boundary line does not overlap or disappear.

According to at least one of the embodiments of the present invention, when an object is located on a specific boundary line of an around view image, an overlapping area is gradually or sequentially changed from an image of a first synthesis area to an image of a second synthesis area so that the image is smoothly changed, thereby preventing the inconvenience such as unnatural feeling caused by abrupt change of the image.

According to at least one of the embodiments of the present invention, when one or more objects approach, an around view image is modulated to prevent a first object among the objects from disappearing, and when a second object is located on a specific boundary line of the modulated around view image and thus the second object disappears, an image acquired from a camera that photographs a portion where the second object is located is displayed on a separate screen to compensate for the disappearance of the second object, thereby improving reliability of a product.

According to at least one of the embodiments of the present invention, when an around view image is modulated, an identification bar is displayed to easily identify the change of each synthesis area in the modulated around view image. Thus, it is possible to induce a driver's attention so that the driver may more actively take necessary steps against an accident.

Further scopes of applicability of the present invention will become apparent from the following detailed description. However, those skilled in the art may understand that various modifications and changes may be possible within the concept and scope of the present invention and the detailed description and specific examples, such as preferred embodiments of the invention, will be given by way of illustration only.

BEST MODE

[Mode for Invention]

Figure 1:
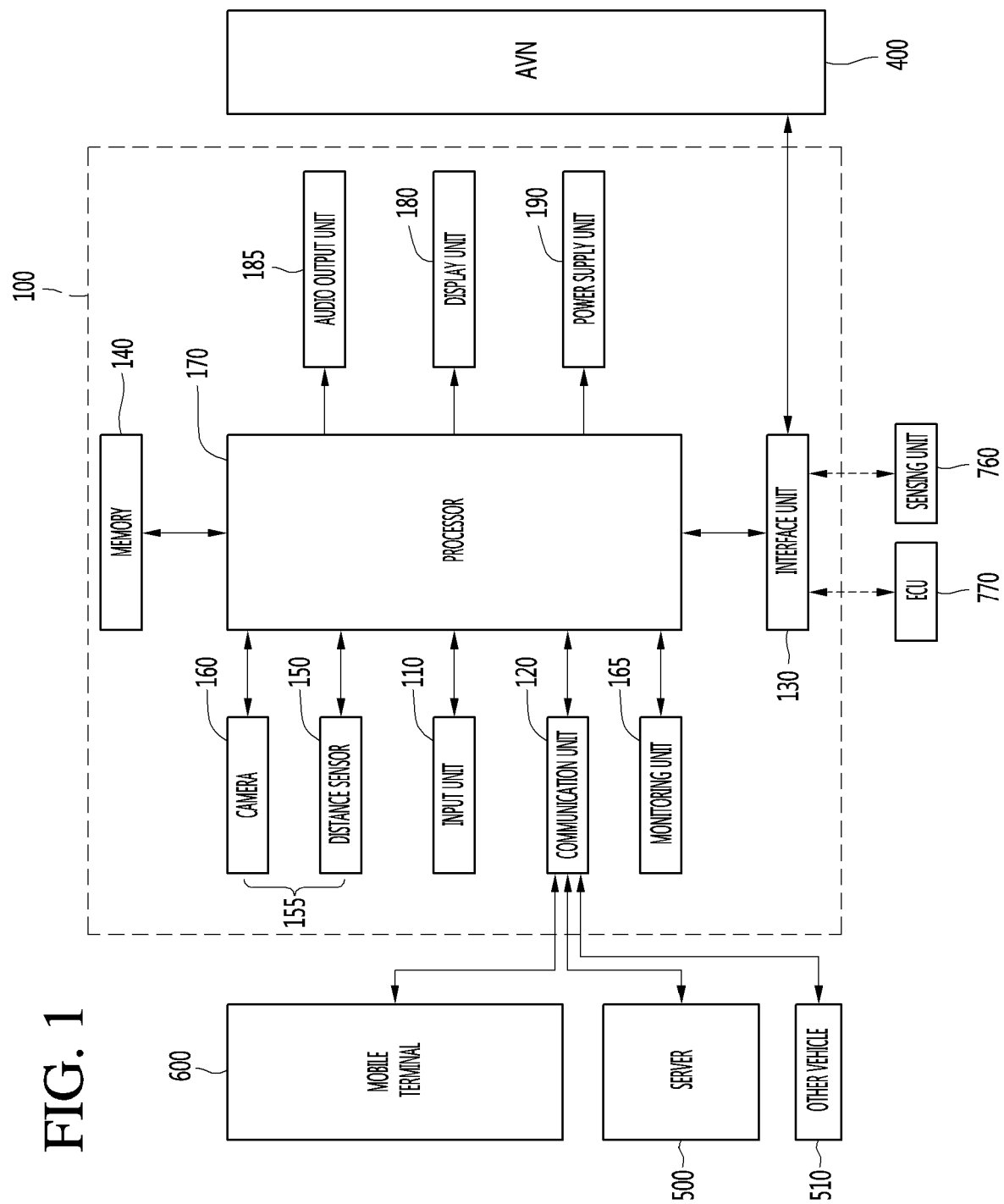
FIG. 1 is a block diagram showing a configuration of an apparatus for providing an around view according to an embodiment of the present invention.

Hereinafter, embodiments of the present specification will be described in detail with reference to accompanying drawings, wherein like reference numerals are used to designate identical or similar elements, and redundant description thereof will be omitted. The suffix "module" and "portion" of the components used in the following description are only given or mixed in consideration of ease of preparation of the description, and there is no meaning or role to be distinguished as it is from one another. In addition, in the following description of the embodiments of the present specification, a detailed description of related arts will be omitted when it is determined that the gist of the embodiments disclosed herein may be obscured. In addition, the accompanying drawings are included to provide a further understanding of the present specification, are incorporated in, and constitute a part of this description, and it should be understood that the present specification is intended to cover all modifications, equivalents, or alternatives falling within the spirit and scope of the present invention.

Terms including ordinals, such as first, second, etc., may be used to describe various components, but the elements are not limited to these terms. The terms are used only for distinguishing one component from another.

When a component is referred to as being "connected" or "joined" to another component, it may be directly connected or joined to the other component, but it should be understood that other component may be present therebetween. When a component is referred to as being "directly connected" or "directly joined" to another component, it should be understood that other component may not be present therebetween.

Unless the context clearly implies otherwise, a singular representation includes plural representations.

In the present application, terms such as "including" or "having" are used to specify the presence of features, numbers, steps, operations, components, parts, or combinations thereof described in the description. However, it should be understood that the terms do not preclude the presence or addition of one or more other features, numbers, steps, operations, components, parts, or combinations thereof.

A vehicle described in the present specification may include all kinds of vehicles such as an automobile and a motorcycle. Hereinafter, a vehicle will be described in case of an automobile as an example.

In addition, the vehicle may have a concept including all of an internal combustion engine vehicle having an engine as a power source, a hybrid vehicle having an engine and an electric motor as a power source, an electric vehicle having an electric motor as a power source, and the like.

Hereinafter, a left side of the vehicle refers to a left side based on a traveling direction of the vehicle, and a right side of the vehicle refers to a right side based on the traveling direction of the vehicle. In the following description, unless otherwise mentioned, the vehicle refers to a left hand drive (LHD) vehicle in which a handle is located to the left side.

An apparatus for providing an around view described in the present specification is a separate apparatus provided in a vehicle and is defined as an apparatus that exchanges necessary information through data communication with a vehicle and provides an around view image of an object around the vehicle. However, according to the embodiment, the apparatus for providing the around view may include a set of some components of the vehicle to constitute a part of the vehicle.

The around view is an image showing the surroundings of the vehicle, and may be called a top view or a bird view. The around view may be generated based on images acquired from mutually different directions.

When the around view providing apparatus is a separate apparatus, at least a part of the components (see FIG. 1) of the around view providing apparatus may not be included in the around view providing apparatus, but may be provided as external components included in a vehicle or a device mounted in the vehicle. It may be understood that these external components may constitute the around view providing apparatus by transmitting and receiving data through an interface unit of the around view providing apparatus.

For convenience of explanation, in the present specification, the apparatus for providing an around view will be described as directly including the components shown in FIG. 1.

Hereinafter, an apparatus for providing an around view according to embodiments will be described in detail with reference to the accompanying drawings.

FIG. 1 is a block diagram showing a configuration of an apparatus for providing an around view according to an embodiment.

Referring to FIG. 1, an around view providing apparatus 100 may include a sensing unit 155 and a processor 170. The around view providing apparatus 100 according to the embodiment may further include at least one of an input unit 110, a communication unit 120, an interface unit 130, a memory 140, a monitoring unit 165, a display unit 180, an audio output unit 185, and a power supply unit 190. However, the components shown in FIG. 1 are not essential for constituting the around view providing apparatus 100 so that the around view providing apparatus 100 according to the embodiment may have more or less components than the components listed above.

In detail, the input unit 110 may sense a user's input. For example, the user may input settings for the around view provided by the around view providing apparatus 100 through the input unit 110, or may input commands to turn on/off the power of the around view providing apparatus 100.

The input unit 110 may include at least one of a gesture input unit (e.g., an optical sensor, etc.) configured to sense a gesture of the user, a touch input unit (e.g., a touch sensor, a touch key, a mechanical key, etc.) configured to sense a touch, and a microphone configured to sense a voice input so as to sense the user's input.

The communication unit 120 may communicate with another vehicle 510, a mobile terminal 600, a server 500, etc.

In this case, the around view providing apparatus 100 may receive at least one of navigation information, other vehicle driving information, and traffic information through the communication unit 120. In addition, the around view providing apparatus 100 may transmit information of the subject vehicle equipped with the around view providing apparatus 100 through the communication unit 120.

Specifically, the communication unit 120 may receive at least one of location information, weather information, and road traffic situation information (e.g., TPEG (Transport Protocol Expert Group), etc.) from the mobile terminal 600 and/or the server 500.

In addition, the communication unit 120 may receive traffic information from the server 500 equipped with an intelligent traffic system (ITS). The traffic information may include traffic signal information, lane information, vehicle periphery information, or location information.

The communication unit 120 may transmit navigation information to the mobile terminal 600 or/and the server 500. The navigation information may include at least one of map information related to running of the vehicle, lane information, location information of the vehicle, set destination information, and route information according to the destination.

For example, the communication unit 120 may receive the real-time location of the vehicle as the navigation information. Specifically, the communication unit 120 may include a GPS (Global Positioning System) module or/and a WiFi (Wireless Fidelity) module to acquire the location of the vehicle.

In addition, the communication unit 120 may receive running information of the other vehicle 510 from the other vehicle 510 and transmit information of the subject vehicle to the other vehicle 510 so as to share vehicle running information. The vehicle running information shared by the vehicles may include at least one of running direction information of the vehicle, location information, vehicle speed information, acceleration information, running route information, forward/backward running information, adjacent vehicle information, and turn signal information.

Further, when the user is seated in the vehicle, the mobile terminal 600 of the user and the around view providing apparatus 100 may perform pairing with each other automatically or by execution of the user's application.

The communication unit 120 may exchange data with the other vehicle 510, the mobile terminal 600, or the server 500 in a wireless manner.

In detail, the communication unit 120 may perform wireless communication using a wireless data communication scheme. The wireless data communication scheme may use technical standards or communication schemes for mobile communication (e.g., GSM (Global System for Mobile communication), CDMA (Code Division Multi Access), CDMA 2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), and the like).

Further, the communication unit 120 may use wireless Internet technology, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-Av (Long Term Evolution-Advanced) and the like.

In addition, the communication unit 120 may use short range communication. For example, the communication unit 120 may support the short range communication by using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus)

Further, the around view providing apparatus 100 may be configured to perform the pairing with the mobile terminal 600 in the vehicle using the short range communication scheme, or to wirelessly exchange data with the other vehicle 510 or the server 500 using a long-distance wireless communication module of the mobile terminal 600.

The interface unit 130 may serve as an interface between an inside and an outside of the around view providing apparatus 100 by receiving data from an ECU (Electronic Control Unit) 770 that controls the overall operation of the vehicle or by transmitting signals processed or generated in the processor 170 to the outside.

Specifically, the around view providing apparatus 100 may receive at least one of vehicle running information, navigation information, and sensing information through the interface unit 130.

In addition, the around view providing apparatus 100 may transmit a control signal for executing the around view or information generated from the around view providing apparatus 100 to the ECU 770 of the vehicle through the interface unit 130.

For this purpose, the interface unit 130 may perform data communication with at least one of the ECU 770, an AVN (Audio Video Navigation) apparatus 400 and a sensing unit 760 installed in the vehicle through a wire or wireless communication scheme.

Specifically, the interface unit 130 may receive navigation information through the data communication with the ECU 770, the AVN apparatus 400, or/and a separate navigation device (not shown).

In addition, the interface unit 130 may receive the sensing information from the ECU 770 or the sensing unit 760.

The sensing information may include at least one of direction information of the vehicle, location information, vehicle speed information, acceleration information, tilt information, forward/backward running information, fuel information, distance information with respect to forward and rearward vehicles, distance information between the vehicle and a lane, and turn signal information.

Further, the sensing information may be acquired from a heading sensor, a yaw sensor, a gyro sensor, a position module, a vehicle forward/backward sensor, a wheel sensor, a vehicle speed sensor, a vehicle body tilt sensor, a battery sensor, a fuel sensor, a tire sensor, a steering wheel sensor based on rotation of a steering wheel, a vehicle interior temperature sensor, a vehicle interior humidity sensor, a door sensor, etc. Meanwhile, the position module may include a GPS module configured to receive GPS information.

The interface unit 130 may receive a user input received through a user input unit 724 of the vehicle. In this case, the interface unit 130 may receive the user input directly from the input unit 724 of the vehicle or via the ECU 770 of the vehicle.

In addition, the interface unit 130 may receive the traffic information acquired from the server 500. The server 500 may be a server located in a traffic control station that controls traffic. For example, when the traffic information is received from the server 500 through a communication unit 710 of the vehicle, the interface unit 130 may receive the traffic information from the ECU 770 of the vehicle.

The memory 140 may store various data for the overall operation of the around view providing apparatus 100, such as a program for processing or controlling of the processor 170.

In addition, the memory 140 may store a plurality of application programs (or applications) driven in the around view providing apparatus 100 and data and instructions for operation of the around view providing apparatus 100. At least a part of the application programs may be downloaded from an external server through wireless communication. Further, at least a part of the application programs may exist in the around view providing apparatus 100 at the time of launching the product to implement the basic functions (e.g., a guidance function around the vehicle) of the around view providing apparatus 100.

Such an application program may be stored in the memory 140 and may be driven by the processor 170 to perform the operation (or function) of the around view providing apparatus 100.

Meanwhile, the memory 140 may store data for identifying objects included in an image. For example, when a predetermined object is detected in the image around the vehicle acquired through a camera 160, the memory 140 may store the data used to check what the object corresponds to through various algorithms.

For example, the memory 140 may store comparison images and comparison data for determining whether an object included in the image acquired through the camera 160 corresponds to an object such as a lane, a traffic sign board, a two-wheeled vehicle, or a pedestrian.

In addition, the memory 140 may store predetermined synthesis information or viewpoint information used to generate an around view image.

Images acquired from mutually different directions may be synthesized to generate an around view. In this case, range information and boundary information of the synthesis area generated from each image may be stored in the memory 140 as synthesis information.

The viewpoint information may be information about a direction viewed from the viewpoint of the camera, but is not limited thereto.

Such a memory 140 may include a storage medium having hardware including at least one of a flash memory type, a hard disk type, an SSD (Solid State Disk) type, an SDD (Silicon Disk Drive) type, a multimedia card micro type, a card type memory (e.g. SD or XD memory), a RAM (random access memory), an SRAM (static random access memory), a ROM (read-only memory), an EEPROM (electrically erasable programmable read-only memory), a PROM (programmable read-only memory), a magnetic memory, a magnetic disk, and an optical disk.

In addition, the around view providing apparatus 100 may be operated in association with a web storage that performs a storage function of the memory 140 on the Internet.

The monitoring unit 165 may acquire information about the internal state of the vehicle.

Information detected by the monitoring unit 165 may include at least one of facial recognition information, fingerprint information, iris-scan information, retina-scan information, hand geometry information, and voice recognition information. Further, the monitoring unit 165 may include other sensors that sense such biometric information.

The around view providing apparatus 100 may further include a sensing unit 155 configured to sense an object around the vehicle. According to the embodiment, the around view providing apparatus 100 may receive the sensing information acquired from the sensing unit 760 of the vehicle through the interface unit 130. The acquired sensing information may be included in vehicle periphery information.

The sensing unit 155 may include at least one of a distance sensor 150 that senses the location of an object in the vicinity of the vehicle and a camera 160 that photographs surroundings of the vehicle to acquire an image.

The distance sensor 150 may precisely detect the location of an object adjacent to the subject vehicle, the spacing direction of the object, the spacing distance, or the moving direction of the object. The distance sensor 150 may continuously measure the location of the detected object to accurately detect a change in the location relationship with respect to the subject vehicle.

The distance sensor 150 may sense objects located in at least one of forward, rearward, leftward and rightward sides of the vehicle. For this purpose, the distance sensor 150 may be located at various locations in the vehicle.

The distance sensor 150 may include at least one of a variety of sensors capable of measuring a distance, such as a Lidar sensor, a laser sensor, an ultrasonic wave sensor, and a stereo camera.

For example, the distance sensor 150 may be a laser sensor that uses a time-of-flight (TOF) scheme or/and a phase-shift scheme according to a laser signal modulation method to precisely measure the location relationship between the subject vehicle and the object.

Meanwhile, information about the object may be acquired by analyzing the image, which is photographed by the camera 160, by using the processor 170. Specifically, the around view providing apparatus 100 photographs the surroundings of the vehicle using the camera 160, and the processor 170 analyzes the acquired surrounding image of the vehicle to detect the objects around the vehicle, thereby generating the sensing information by determining the attributes of the objects.

The object information may include at least one of the type of the objects, traffic signal information displayed by the objects, the distance between the object and the vehicle, and the location of the object and may be included in the sensing information.

Specifically, the processor 170 may generate the object information by performing object analysis such as detecting the object from the photographed image by processing the image, tracking the object, measuring the distance with respect to the object, and confirming the object.

Although not shown in the drawings, the sensing unit 155 may further include an ultrasonic sensor. The ultrasonic sensor may include, but is not limited to, a plurality of ultrasonic sensors. The object around the vehicle may be detected based on a difference between the ultrasonic waves transmitted from each ultrasonic sensor and the ultrasonic waves received while being reflected from the object.

Meanwhile, the processor 170 may synthesize images photographed from various directions to provide an around view image of the vehicle viewed from the top.

In order to allow the processor 170 to perform object analysis more easily, according to the embodiment, the camera 160 may be a stereo camera that measures the distance with respect to the object while capturing the image.

The camera 160 may directly include an image sensor and an image processing module. In this case, the camera 160 may process still images or moving images acquired by an image sensor (e.g., CMOS or CCD). In addition, the image processing module may process the still image or moving image acquired through the image sensor to extract necessary image information, and may transmit the extracted image information to the processor 170.

The sensing unit 155 may be a stereo camera in which the distance sensor 150 and the camera 160 are combined. That is, the stereo camera may detect the location relationship with respect to the object while acquiring the image.

The display unit 180 may display the around view image. The display unit 180 may include at least one display area as needed. Mutually different image information may be displayed in each display area.

The audio output unit 185 may output a message as an audio to explain the around view and to confirm whether or not it is executed. Thus, the around view providing apparatus 100 may perform the visual display through the display unit 180 while explaining the function of the around view providing apparatus 100 by outputting the sound using the audio output unit 185.

According to an embodiment, the around view providing apparatus 100 may further include a haptic output unit (not shown) configured to output a haptic signal. The haptic output unit (not shown) may output an alarm for the around view as a haptic. For example, when warning for a driver is included in at least one of navigation information, traffic information, communication information, vehicle status information, driving assistance function (ADAS) information, and other driver's convenience information, the around view providing apparatus 100 may notify the driver of the warning by vibration.

Such a haptic output unit (not shown) may provide the vibration having directionality. For example, the haptic output unit (not shown) may be disposed in a steering wheel that controls the steering wheel to output the vibration. When the vibration is provided, the haptic output unit may output the vibration by distinguishing the left and right of the steering wheel so that the haptic output may have directionality.

The power supply unit 190 may receive external power and internal power under the control of the processor 170 to supply power required for the operation of each component.

The processor 170 may control the overall operation of each component in the around view providing apparatus 100.

In addition, in order to drive an application program, the processor 170 may control at least a part of the components included in the around view providing apparatus 100 or may operate at least two of the components by combining the components.

Such a processor 170 may be implemented in at least one type in terms of hardware among application specific integrated circuits (ASICs), digital signal processors (DSPs), digital signal processing devices (DSPDs), programmable logic devices (PLDs), field programmable gate arrays (FPGAs), controllers, micro-controllers, microprocessors 170, and electrical units for performing other functions.

According to an embodiment, the processor 170 may be controlled by the ECU 770 of the vehicle.

In addition to the operation related to application programs stored in the memory 140, the processor 170 may typically control the overall operation of the around view providing apparatus 100. The processor 170 may process the signal, data and information, which are input or output through the components discussed above or may drive application programs stored in the memory 140 so as to process or provide appropriate information or function to a user.

Figure 2A:
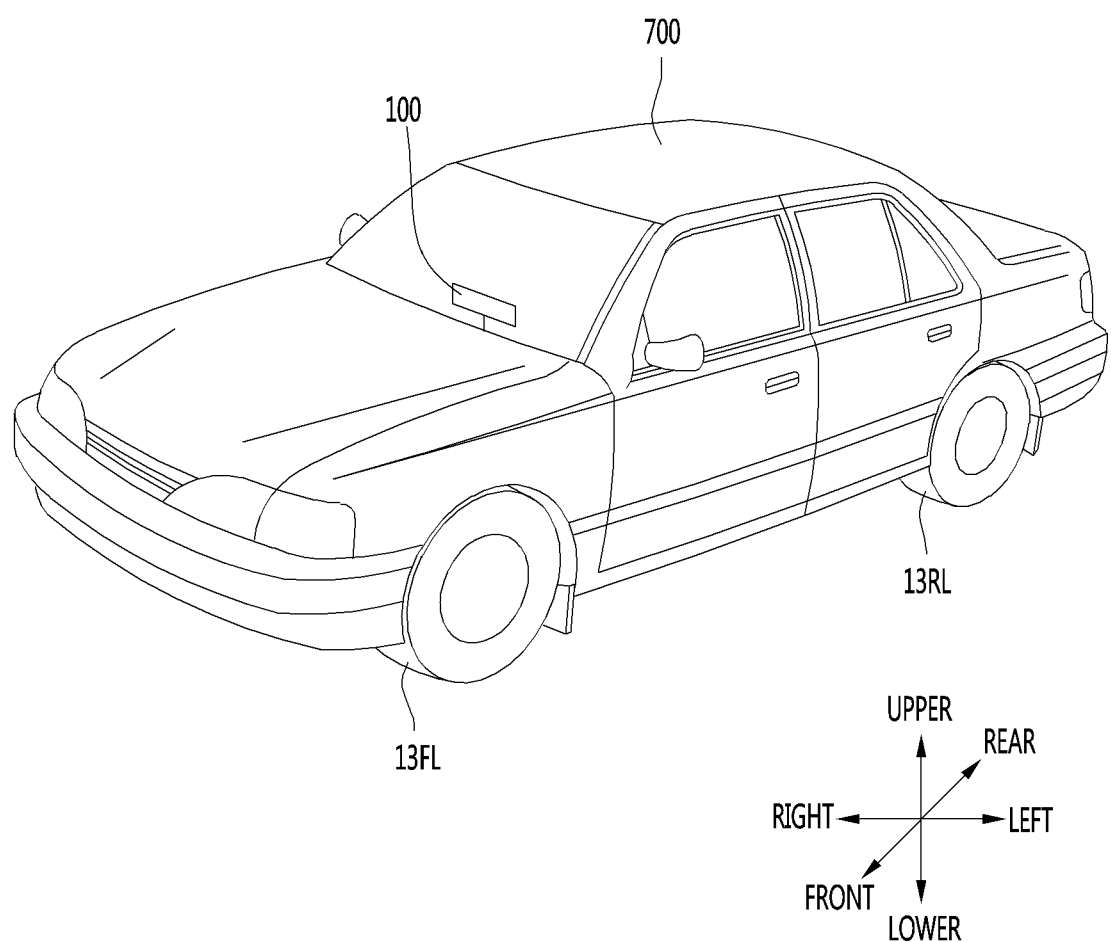
FIG. 2A is a view showing an exterior of a vehicle including an apparatus for providing an around view according to an embodiment.

FIG. 2A is a view showing an exterior of a vehicle including an apparatus for providing an around view according to an embodiment.

Referring to FIG. 2A, a vehicle 700 according to an embodiment may include wheels 13FL and 13RL rotated by a power source, and an around view providing apparatus 100 that provides the user with object information around the vehicle.

The around view providing apparatus 100 may be installed inside the vehicle 700. In this case, the installation position of the around view providing apparatus 100 may be variously set according to the embodiments. Referring to FIG. 2A, the around view providing apparatus 100 may be disposed at a lower end of a front window of the vehicle 700.

Figure 2B:
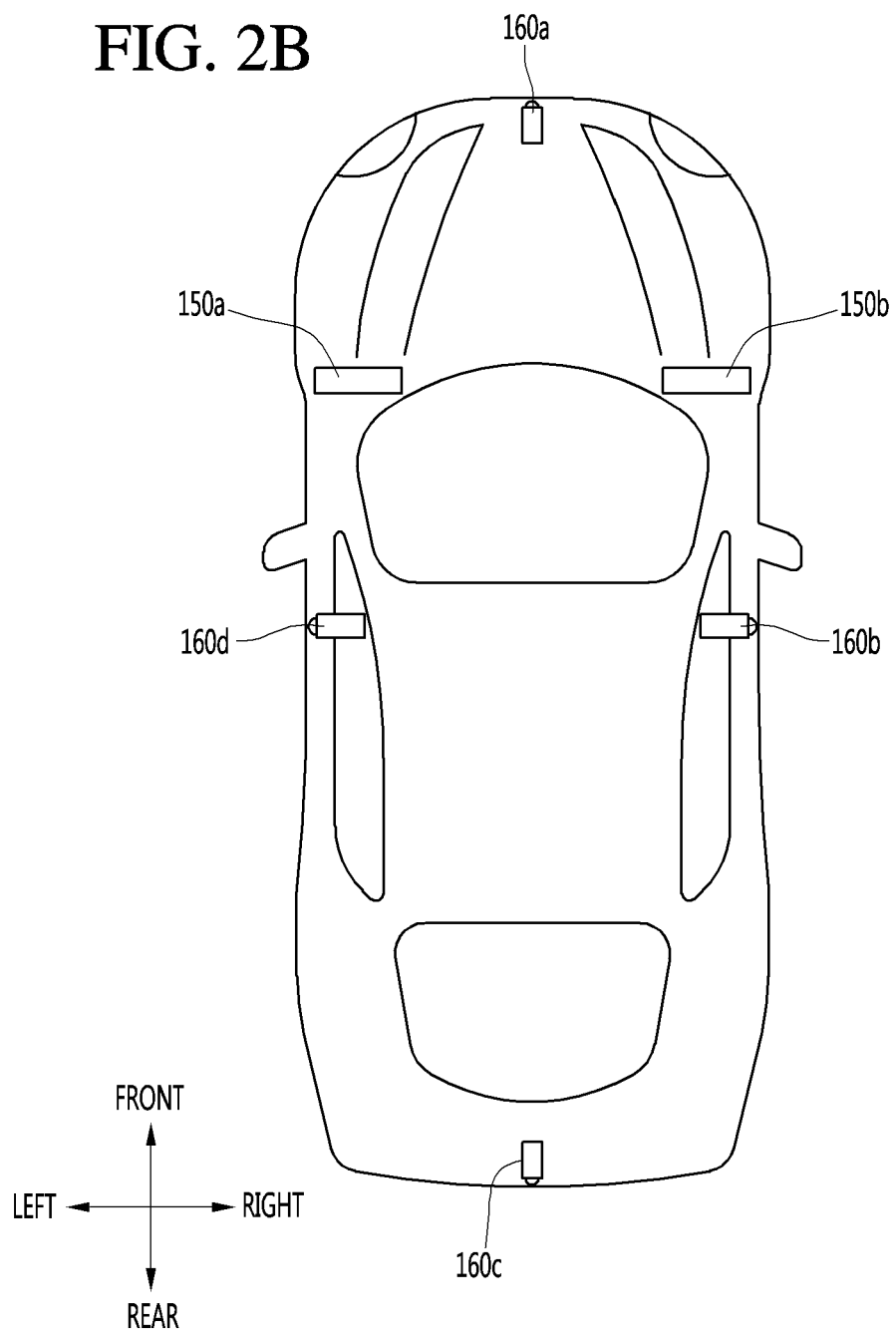
FIG. 2B is a view showing a sensor unit included in an apparatus for providing an around view according to an embodiment and installed in a vehicle.

FIG. 2B is a view showing a sensor unit included in an apparatus for providing an around view according to an embodiment and installed in a vehicle.

The distance sensor 150 included in the sensing unit 155 may be disposed on at least one of the front, rear, left, right, and ceiling of a vehicle body. Referring to FIG. 2B, distance sensors 150a and 150b may be disposed on the left side surface and the right side surface of the vehicle, respectively.

The camera 160 included in the sensing unit 155 may be provided at various positions to monitor the forward, rearward, leftward, and rightward sides in the running direction. Referring to FIG. 2B, cameras 160a, 160b, 160c, and 160d may be disposed at the front, rear, left, and right sides of the vehicle, respectively.

For example, a camera 160a installed on the front side may be called a first camera, a camera 160b installed on the right side may be called a second camera, a camera 160c installed on the rear side may be called a third camera, and a camera 160d installed on the left side may be called a fourth camera, but the embodiment is not limited thereto. Among a plurality of cameras 160a, 160b, 160c, and 160d, the first-mentioned camera may be referred to as a first camera, and the next-mentioned camera may be referred to as a second camera.

The first camera 160a may acquire a forward image by photographing a forward side in the running direction. For this purpose, the first camera 160a may be disposed in the vicinity of an emblem or a radiator grille.

The second camera 160b may be disposed in a case surrounding a right side mirror. According to the embodiment, the second camera 160b may be disposed outside the case surrounding the right side mirror, or may be disposed in one area outside a right front door, a right rear door, or a right fender.

The third camera 160c may acquire a rearward image by photographing a rearward side in the running direction. The third camera 160c may be disposed in the vicinity of a rear license plate or a trunk switch.

The fourth camera 160d may be disposed in a case surrounding a left side mirror. According to the embodiment, the fourth camera 160d may be disposed outside the case surrounding the left side mirror, or may be disposed in one area outside a left front door, a left rear door, or a left fender.

Although not shown in the drawings, an additional camera may be installed on the ceiling of the vehicle. The ceiling camera may photograph all of forward, rearward, leftward and rightward directions of the vehicle.

In addition, a camera may be additionally provided in addition to the first to fourth cameras 160a, 160b, 160c, and 160d as necessary.

Figure 3:
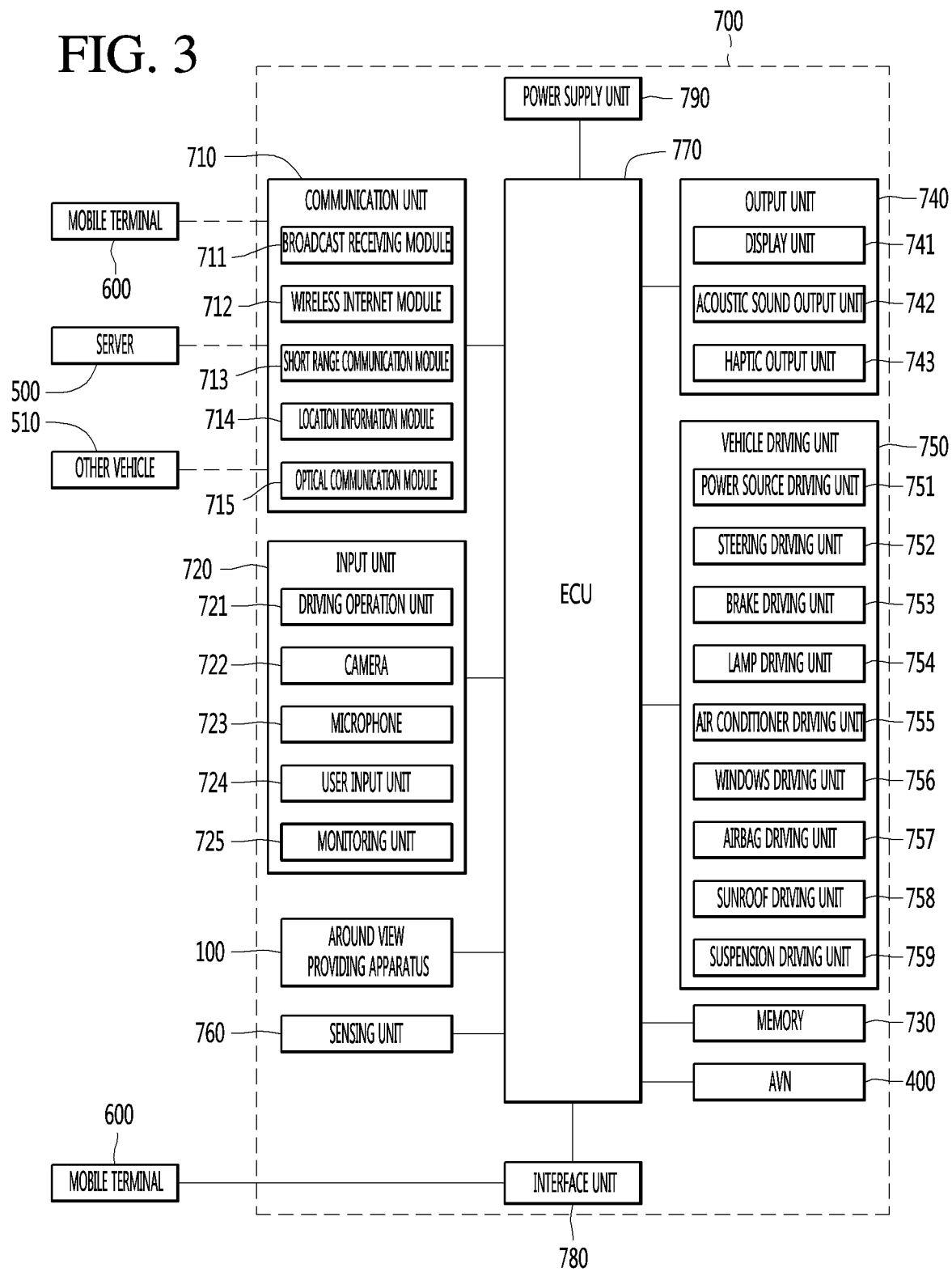
FIG. 3 is a block diagram showing a configuration of a vehicle including an apparatus for providing an around view according to an embodiment.

FIG. 3 is a block diagram showing a configuration of a vehicle including an apparatus for providing an around view according to an embodiment.

The around view providing apparatus 100 according to the embodiment may be installed in the vehicle 700.

Referring to FIG. 3, the vehicle 700 may include a communication unit 710, an input unit 720, a sensing unit 760, an output unit 740, a vehicle driving unit 750, a memory 730, an interface unit 780, an ECU 770, a power supply unit 790, the around view providing apparatus 100, and an AVN apparatus 400.

The communication unit 710 may include at least one module that enables wireless communication between the vehicle 700 and the mobile terminal 600, between the vehicle 700 and the external server 500, or between the vehicle 700 and the other vehicle 510. In addition, the communication unit 710 may include at least one module that connects the vehicle 700 to at least one network.

The communication unit 710 may include a broadcast receiving module 711, a wireless Internet module 712, a short range communication module 713, a location information module 714, and an optical communication module 715.

The broadcast receiving module 711 may receive a broadcast signal or broadcast-related information from an external broadcast management server through a broadcast channel. The broadcast may include a radio broadcast or a TV broadcast.

The wireless Internet module 712 refers to a module for wireless Internet access, and may be built in the vehicle 700 or externally mounted on the vehicle 700. The wireless Internet module 712 may be configured to transmit and receive wireless signals through a communication network according to wireless Internet technologies.

Examples of the wireless Internet technology may include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like. The wireless Internet module 712 may transmit and receive data according to at least one wireless Internet technology within a scope including even Internet technologies not listed above. For example, the wireless Internet module 712 may exchange data with the external server 500 in a wireless manner. The wireless Internet module 712 may receive weather information and road traffic situation information (for example, TPEG (Transport Protocol Expert Group)) from the external server 500.

The short range communication module 713 is used for short range communication and may support the short range communication by using at least one of Bluetooth™, RFID (Radio Frequency Identification), Infrared Data Association (IrDA), UWB (Ultra WideBand), ZigBee, NFC (Near Field Communication), Wi-Fi (Wireless-Fidelity), Wi-Fi Direct, and Wireless USB (Wireless Universal Serial Bus).

The short range communication module 713 may form a short range wireless area network to perform the short range communication between the vehicle and at least one external device. For example, the short range communication module 713 can exchange data with the mobile terminal 600 wirelessly. The short range communication module 713 may receive weather information and traffic situation information of the road (for example, TPEG (Transport Protocol Expert Group)) from the mobile terminal 600. For example, when the user has boarded the vehicle, the user's mobile terminal 600 and the vehicle can perform pairing with each other automatically or by execution of the user's application.

The location information module 714 is a module for acquiring the location of the vehicle, and a representative example thereof is a Global Positioning System (GPS) module. For example, the vehicle 700 may use the GPS module to acquire the location of the vehicle 700 based on the signal sent from a GPS satellite.

The optical communication module 715 may include a light emitting unit and a light receiving unit.

The light receiving unit may convert a light signal into an electrical signal to receive information. The light receiving unit may include a photodiode (PD) configured to receive light. Photodiodes may convert light into electrical signals. For example, the light receiving unit may receive information of a forward vehicle through light emitted from a light source included in the forward vehicle.

The light emitting unit may include at least one light emitting device configured to convert an electrical signal into a light signal. The light emitting device may be an LED (Light Emitting Diode). The light emitting unit may convert the electrical signal into the light signal and transmit the light signal to the outside. For example, the light emitting unit may emit the light signal to the outside through the blinking of the light emitting device corresponding to a predetermined frequency. According to an embodiment, the light emitting unit may include a plurality of light emitting device arrays. According to an embodiment, the light emitting unit may be integrated with a lamp provided in the vehicle. For example, the light emitting unit may be at least one of a headlight, a tail light, a brake light, a turn signal lamp, and a sidelight.

According to one embodiment, the optical communication module 715 may exchange data with the other vehicle 510 through optical communication.

The input unit 720 may include a driving operation unit 721, a camera 722, a microphone 723, a user input unit 724, and a monitoring unit 725.

The driving operation unit 721 may receive a user input for driving the vehicle. The driving operation unit 721 may include a steering wheel input device, a shift input device, an acceleration input device, a brake input device, and the like.

The steering wheel input device may receive an input in relation to the running direction of the vehicle 700. The steering wheel input device may be prepared in the form of a wheel so that the steering wheel input may be possible by rotation. According to an embodiment, the steering wheel input device may be prepared in the form of a touch screen, a touch pad or a button.

The shift input device may receive inputs in relation to parking (P), forward driving (D), neutral (N) and reverse driving (R) of the vehicle. The shift input device may be prepared in the form of a lever. According to an embodiment, the shift input device may be formed of a touch screen, a touch pad or a button.

The acceleration input device may receive an input for acceleration of the vehicle. The brake input device may receive an input for deceleration of the vehicle. In this case, the acceleration input device and the brake input device may be prepared in the form of a pedal. According to an embodiment, the acceleration input device or the brake input device may be prepared in the form of a touch screen, a touch pad or a button.

The camera 722 may include an image sensor and an image processing module. The camera 722 may process still images or moving images acquired by the image sensor (e.g., CMOS or CCD). The image processing module may process the still image or moving image acquired through the image sensor to extract necessary information, and may transmit extracted information to the ECU 770. Meanwhile, the vehicle 700 may include the camera 722 for capturing images in front or periphery of the vehicle, and the monitoring unit 725 for capturing an image in an interior of the vehicle.

The monitoring unit 725 may acquire an image of the passenger. The monitoring unit 725 may acquire an image for biometric recognition of the occupant.

Meanwhile, although the monitoring unit 725 and the camera 722 are included in the input unit 720 in FIG. 3, the camera 722 may be included in the around view providing apparatus 100 as described above.

The microphone 723 may process an external acoustic signal into electrical data. The processed data may be variously utilized according to functions performed in the vehicle 700. The microphone 723 may convert the voice command of the user into electrical data. The converted electrical data may be transmitted to the ECU 770.

The user input unit 724 may receive information from a user. When the information is input through the user input unit 724, the ECU 770 may control the operation of the vehicle 700 corresponding to the input information. The user input unit 724 may include a touch input device or a mechanical input device. According to an embodiment, the user input unit 724 may be located at one area of the steering wheel. In this case, the driver may operate the user input unit 724 using a finger while holding the steering wheel.

The sensing unit 760 may sense a signal related to the running of the vehicle. For this purpose, the sensing unit 760 may include a collision sensor, a wheel sensor, a speed sensor, a tilt sensor, a weight sensor, a heading sensor, a yaw sensor, a gyro sensor, a position module, a vehicle forward/rearward running sensor, a battery sensor, a fuel sensor, a tire sensor, a steering sensor by rotation of a steering wheel, a vehicle internal temperature sensor, a vehicle internal humidity sensor, an ultrasonic sensor, a radar, and a LIDAR.

Thus, the sensing unit 760 may acquire a sensing signal for vehicle collision information, vehicle direction information, vehicle position information (GPS information), vehicle angle information, vehicle speed information, vehicle acceleration information, vehicle tilt information, vehicle forward/rearward running information, battery information, fuel information, tire information, vehicle lamp information, vehicle internal temperature information, vehicle interior humidity information, steering wheel rotation angle, and the like.

Meanwhile, the sensing unit 760 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The sensing unit 760 may include a biometric information sensing unit. The biometric information sensing unit may sense and acquire biometric information of an occupant. The biometric information may include fingerprint information, iris-scan information, retina-scan information, hand geometry information, facial recognition information, and voice recognition information. The biometric information sensing unit may include a sensor that senses the biometric information of the occupant. Here, the monitoring unit 725 and the microphones 723 may operate as sensors. The biometric information sensing unit may acquire hand shape information and face recognition information through the monitoring unit 725.

The output unit 740 may be a component for outputting information processed by the ECU 770 and may include a display unit 741, an acoustic sound output unit 742, and a haptic output unit 743.

The display unit 741 may display information processed by the ECU 770. For example, the display unit 741 may display information related to the vehicle. The information related to the vehicle may include vehicle control information for direct control of the vehicle, or vehicle driving assistance information for guiding the driving to the driver. Further, the information related to the vehicle may include vehicle status information indicating the current state of the vehicle or vehicle driving information related to the driving of the vehicle.

The display unit 741 may be the display unit 180 of the around view providing apparatus 100 or may be separately provided.

The display unit 741 may be implemented by at least one of a liquid crystal display (LCD), a thin film transistor-liquid crystal display (TFT LCD), an organic light-emitting diode (OLED), a flexible display, a 3D display, and an e-ink display.

The display unit 741 may form a layer structure together with a touch sensor or may be integrally formed with the touch sensor to implement a touch screen. This touch screen may serve as the user input unit 724 that provides an input interface between the vehicle 700 and the user and may provide an output interface between the vehicle 700 and the user. In this case, the display unit 741 may include the touch sensor that senses a touch with respect to the display unit 741 so that a control command may be received by a touch method. When a touch is made on the display unit 741 using this, the touch sensor may sense the touch, and the ECU 770 may generate a control command corresponding to the touch. The content input by the touch method may be a letter or a number, or a menu item which may be indicated or designated in various modes.

Meanwhile, the display unit 741 may include a cluster so that the driver can check the vehicle status information or the vehicle driving information while driving the vehicle. The cluster may be located on a dashboard. In this case, the driver may check information displayed on the cluster while keeping his or her gaze ahead of the vehicle.

In addition, according to an embodiment, the display unit 741 may be implemented as a head-up display (HUD). When the display unit 741 is implemented as a HUD, information may be output through a transparent display provided in a windshield. Alternatively, the display unit 741 may include a projection module to output information through an image projected on the windshield.

The acoustic sound output unit 742 may convert an electrical signal from the ECU 770 into an audio signal to output the audio signal. For this purpose, the acoustic sound output unit 742 may include a speaker or the like. The acoustic sound output unit 742 may output a sound corresponding to the operation input by the user input unit 724.

The haptic output unit 743 may generate a tactile output. For example, the haptic output unit 743 may vibrate a steering wheel, a safety belt, and a seat so that the user may recognize the output.

The vehicle driving unit 750 may control the operation of various devices and components included in the vehicle 700. The vehicle driving unit 750 may include a power source driving unit 751, a steering driving unit 752, a brake driving unit 753, a lamp driving unit 754, an air conditioner driving unit 755, a window driving unit 756, an airbag driving unit 757, a sunroof driving unit 758 and a suspension driving unit 759.

The power source driving unit 751 may perform the electronic control for the power source in the vehicle 700.

For example, when a fossil fuel-based engine (not shown) is the power source, the power source driving unit 751 may perform the electronic control for the engine. Thus, the output torque of the engine and the like may be controlled. When the power source driving unit 751 is an engine, the speed of the vehicle may be limited by restricting the engine output torque under the control of the ECU 770.

In another example, when an electric motor (not shown) is the power source, the power source driving unit 751 may control the motor. Accordingly, the rotation speed, torque, etc. of the motor may be controlled.

The steering driving unit 752 may perform the electronic control for a steering apparatus in the vehicle. Thus, it is possible to change the running direction of the vehicle.

The brake driving unit 753 may perform the electronic control for a brake apparatus (not shown) in the vehicle. For example, it is possible to reduce the speed of the vehicle by controlling the operation of the brakes disposed on the wheels. As another example, it is possible to adjust the running direction of the vehicle to the left or right by individually operating brakes disposed on a left wheel and a right wheel, respectively.

The lamp driving unit 754 may control the turn-on/turn-off of a lamp disposed inside and outside the vehicle. Further, the intensity and direction of the light of the lamp may be controlled. For example, it is possible to control a turn signal lamp, a brake lamp, and the like.

The air conditioner driving unit 755 may perform the electronic control for an air conditioner (not shown) in the vehicle. For example, when the temperature inside the vehicle is high, it is possible to control the air conditioner to operate so that cool air can be supplied to the interior of the vehicle 700.

The window driving unit 756 may perform the electronic control for a window apparatus in the vehicle. For example, it is possible to control the opening or closing of left-side and right-side windows of the vehicle 700.

The airbag driving unit 757 may perform the electronic control for an airbag apparatus in the vehicle. For example, in the event of an accident, the airbag may be controlled to be deployed.

The sunroof driving unit 758 may perform the electronic control for a sunroof device (not shown) in the vehicle. For example, the opening or closing of a sunroof may be controlled.

The suspension driving unit 759 may perform the electronic control for a suspension device (not shown) in the vehicle 700. For example, when there is a curvature on a road surface, it is possible to control the suspension device to reduce the vibration of the vehicle.

The memory 730 may be electrically connected to the ECU 770. The memory 730 may store basic data for the unit, control data for controlling the operation of the unit, and input/output data. The memory 730 may include various storage media having hardware such as ROM, RAM, EPROM, flash drive, hard drive, and the like. The memory 730 may store various data required for controlling the overall operation of the vehicle, such as a program for processing or controlling of the ECU 770.

The interface unit 780 may serve as a channel for connecting various types of external devices connected to the vehicle 700. For example, the interface unit 780 may include a port which can be connected to the mobile terminal 600, and may be connected to the mobile terminal 600 through the port. In this case, the interface unit 780 may exchange data with the mobile terminal 600.

Meanwhile, the interface unit 780 may serve as a channel for supplying electrical energy to the mobile terminal 600 connected to the interface unit 780. When the mobile terminal 600 is electrically connected to the interface unit 780, the interface unit 780 may provide the electrical energy supplied from the power supply unit 790 to the mobile terminal 600 under the control of the ECU 770.

The ECU 770 may control the overall operation of each component in the vehicle 700. The ECU 770 may be called an ECU (Electronic Control Unit).

As an execution signal of the around view providing apparatus 100 is transferred thereto, the ECU 770 may perform a function corresponding to the transmitted signal.

The ECU 770 may be implemented in at least one type in terms of hardware among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The controller or the microprocessor may be a device different from the processor 170 included in the around view providing apparatus 100.

According to the control of the ECU 770, the power supply unit 790 may supply the power necessary for operation of each component. In this case, the power supply unit 790 may receive the power from a battery (not shown) or the like installed in the vehicle.

The AVN (Audio Video Navigation) apparatus 400 may exchange data with the ECU 770. The ECU 770 may receive navigation information from the AVN apparatus 400 or a separate navigation device (not shown). The navigation information may include set destination information, route information according to the destination, map information related to the running of the vehicle, or vehicle location information.

Figure 4:
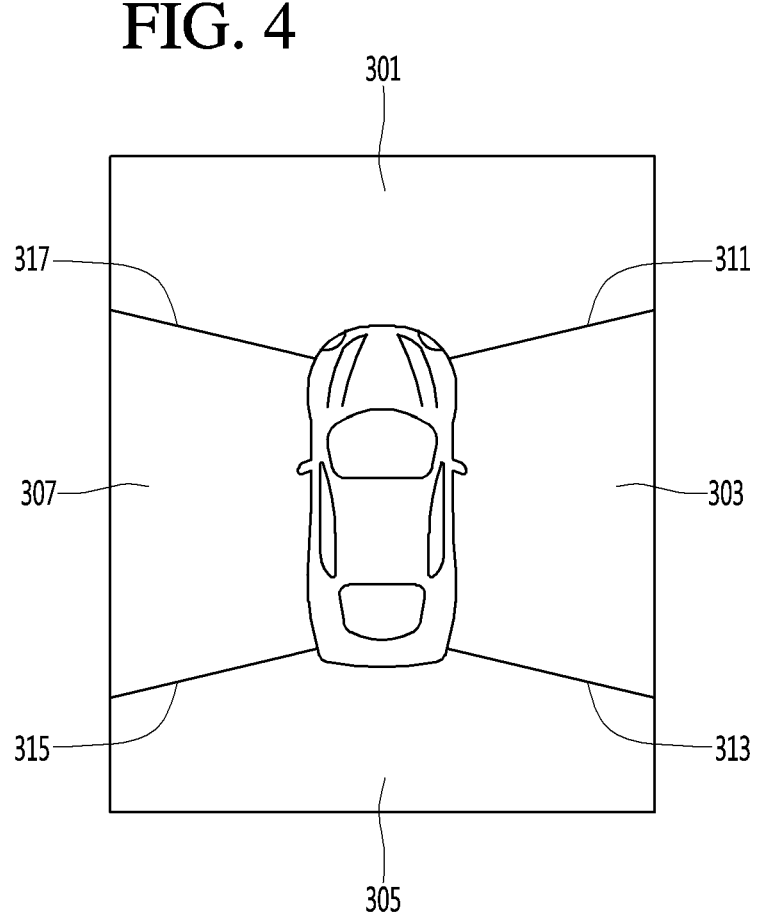
FIG. 4 is a view showing an around view image.

FIG. 4 shows an around view image.

Referring to FIG. 4, the around view image may include first to fourth synthesis areas 301, 303, 305, and 307. Such an around view image may be displayed on the display unit 180. The first to fourth synthesis areas 301, 303, 305, and 307 may be referred to as first to fourth areas.

The first synthesis area 301 may be generated based on a forward image acquired by the first camera installed at a front of the vehicle 700. The second synthesis area 303 may be generated based on a rightward image acquired by the second camera installed on the right side of the vehicle 700. The third synthesis area 305 may be generated based on a rearward image acquired by the third camera installed on the rear side of the vehicle 700. The fourth synthesis area 307 may be generated based on a leftward image acquired by the fourth camera installed on the left side of the vehicle 700.

The images of the respective synthesis areas 301, 303, 305, and 307 may be different from the images acquired from the first to fourth cameras 160*a*, 160*b*, 160*c*, and 160*d*.

That is, the images acquired from the first to fourth cameras 160*a*, 160*b*, 160*c*, and 160*d* may be the images input through lenses of the cameras 160*a*, 160*b*, 160*c*, and 160*d* so that actual shapes of the objects may be represented in the images. In contrast, the images of the synthesis areas 301, 303, 305, and 307 may be images acquired by changing the viewpoint of the images acquired from the first to fourth cameras 160*a*, 160*b*, 160*c*, and 160*d* from the forward view to the top view.

For example, when an object of an image acquired from a specific camera among the first to fourth cameras 160*a*, 160*b*, 160*c*, and 160*d* is a standing person, a person who is an object in the synthesis area generated from the acquired image may be seen as a lying person other than the standing person.

The first to fourth synthesis areas 301, 303, 305, and 307 may be disposed adjacent to each other about boundary lines 311, 313, 315, and 317. For example, the first synthesis area 301 and the second synthesis area 303 may be disposed adjacent to each other about the first boundary line 311. The second synthesis area 303 and the third synthesis area 305 may be disposed adjacent to each other about the second boundary line 313. The third synthesis area 305 and the fourth synthesis area 307 may be disposed adjacent to each other about the third boundary line 315. The fourth synthesis area 307 and the first synthesis area 301 may be disposed adjacent to each other about the fourth boundary line 317.

The around view image may be generated based on synthesis information stored in the memory 140. As described above, the synthesis information may include range information of the first to fourth synthesis areas generated from each of the images acquired from the first to fourth cameras 160*a*, 160*b*, 160*c*, and 160*d* and boundary line information about the boundary lines between the first to fourth synthesis information, and the synthesis information may be stored in the memory 140.

The boundary line information may be set as locations of the first to fourth boundary lines 311, 313, 315, and 317. The range information of the synthesis area may be set as a range of each of the synthesis areas 301, 303, 305, and 307.

Therefore, the processor 170 may generate each of the synthesis areas 301, 303, 305 and 307 from the images acquired from the first to fourth cameras 160*a*, 160*b*, 160*c*, and 160*d* based on the range information and the boundary line information of the synthesis information and may generate the around view image by synthesizing the synthesis areas 301, 303, 305, and 307.

The around view image generated as described above may be displayed on the display unit 180 in a normal mode.

Specifically, the processor 170 may extract images corresponding to intervals between the boundary lines 311, 313, 315, and 317 from the images acquired from the first to fourth cameras 160a, 160b, 160c, and 160d based on the range information and the boundary line information of the synthesis area set in the boundary line information so as to generate an around view image including the first to fourth synthesis areas based on the extracted images.

As described above, the images acquired from the first to fourth cameras 160a, 160b, 160c, and 160d may be different from the first to fourth synthesis areas which are generated from the acquired images.

Figure 5A:
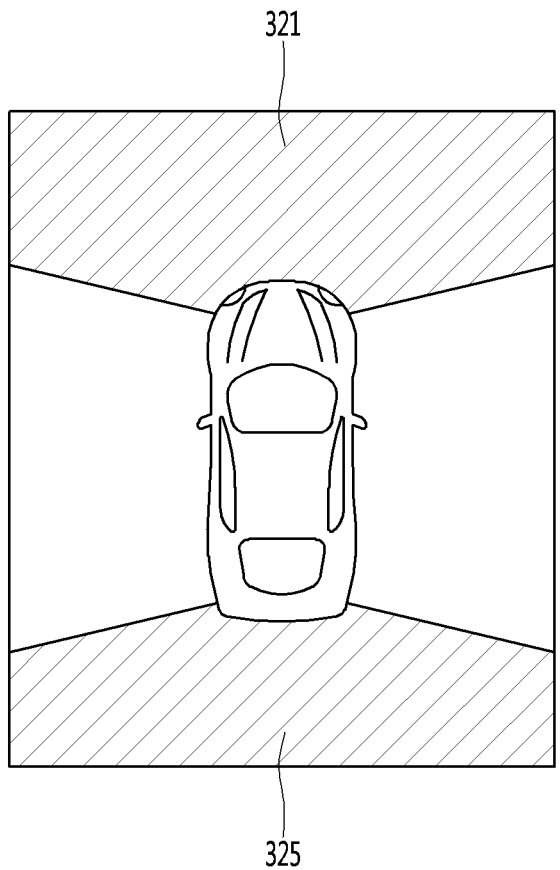
FIG. 5A is a view showing images acquired from first and third cameras, respectively.
Figure 5B:
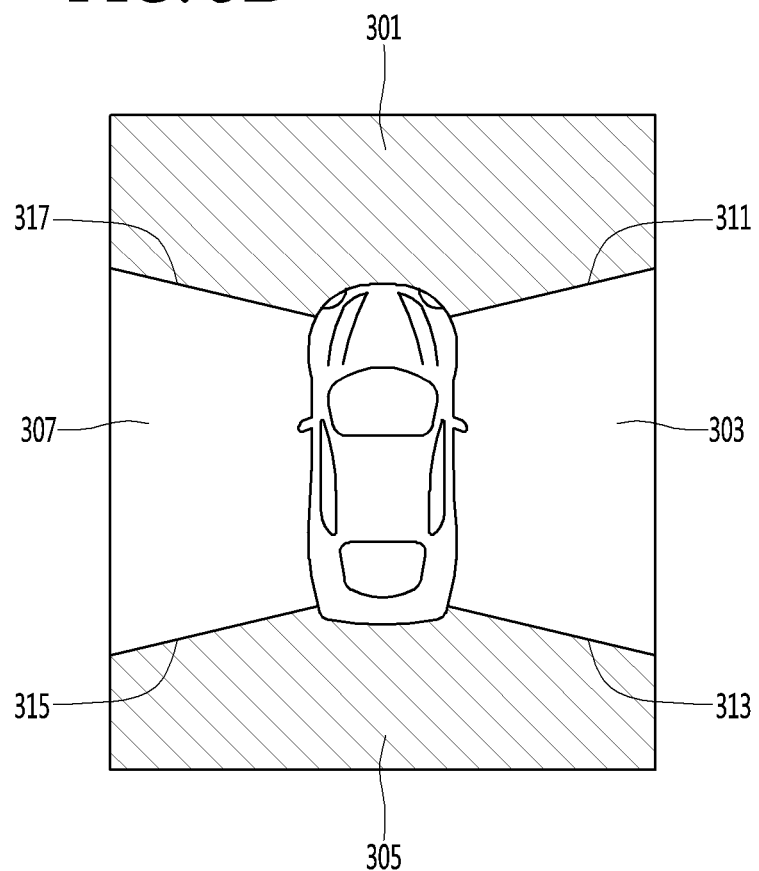
FIG. 5B is a view showing first and third synthesis areas generated based on the images acquired from the first and third cameras, respectively.

FIG. 5A is a view showing images acquired from the first and third cameras, respectively, and FIG. 5B is a view showing first and third synthesis areas generated based on the images acquired from the first and third cameras, respectively.

The sizes of first and third images 321 and 325 (FIG. 5A) acquired from the first and third cameras 160a and 160c, respectively, may be equal to the sizes of the first and third synthesis areas 301 and 305 (FIG. 5B), respectively.

A first boundary line 311 and a fourth boundary line 317 may be disposed at both ends of the first synthesis area 301. In other words, the first synthesis area 301 may be disposed between the first and fourth boundary lines 311 and 317.

A second boundary line 313 and a third boundary line 315 may be disposed at both ends of the third synthesis area 305. In other words, the third synthesis area 305 may be disposed between the second and third boundary lines 313 and 315.

Alternatively, the first and third synthesis areas 301 and 305 may be generated based on the first and third images corresponding to a part of the images acquired from the first and third cameras 160a and 160c, respectively. In this case, the sizes of the first and third synthesis areas 301 and 305 may be smaller than the sizes of the first and third images.

Figure 6A:
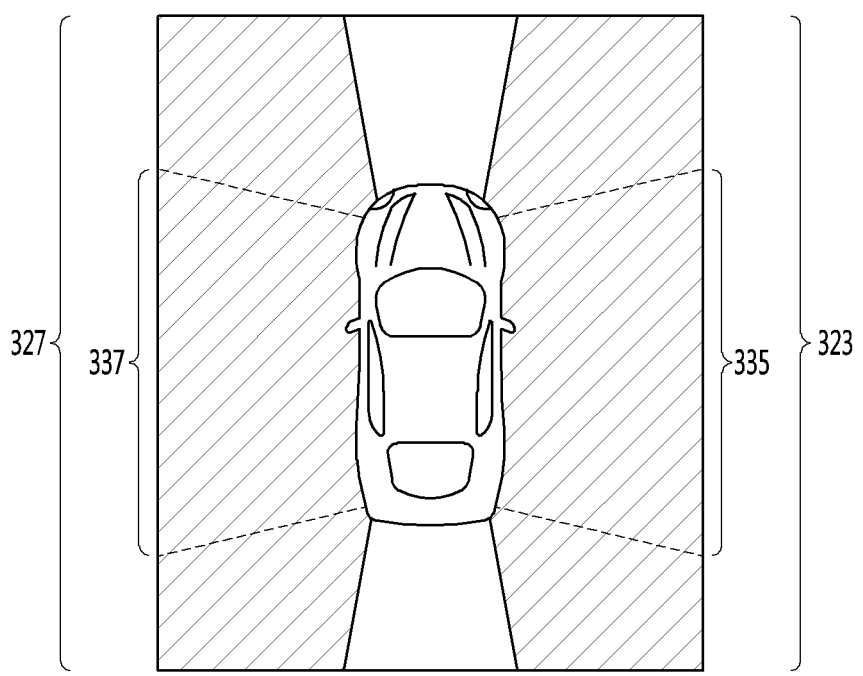
FIG. 6A is a view showing images acquired from second and fourth cameras, respectively.
Figure 6B:
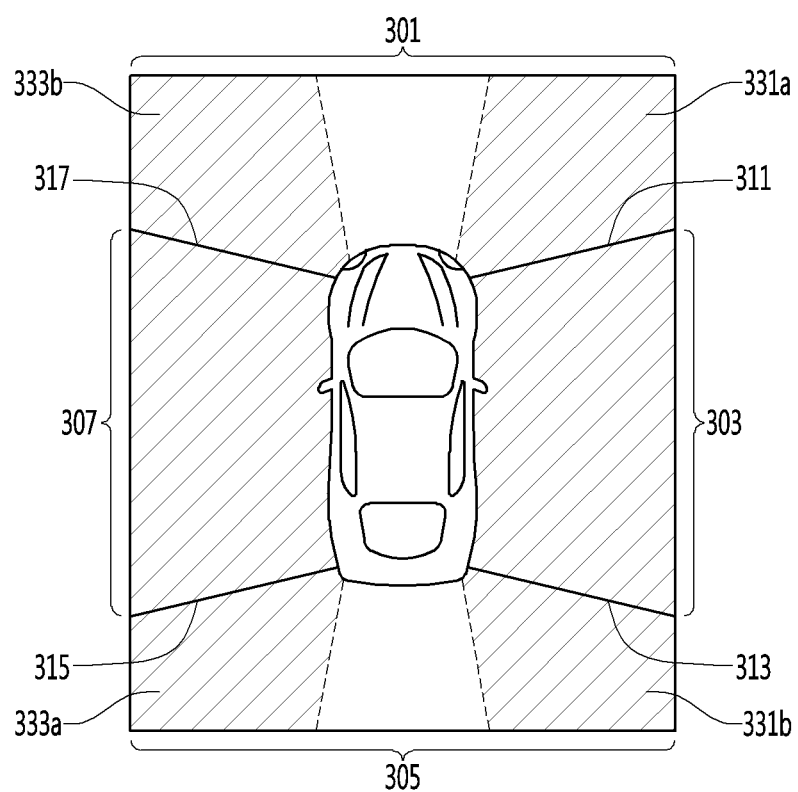
FIG. 6B is a view showing second and fourth synthesis areas generated based on second and fourth images acquired from the second and fourth cameras, respectively.

FIG. 6A is a view showing images acquired from the second and fourth cameras, respectively, and FIG. 6B is a view showing second and fourth synthesis areas generated based on second and fourth images acquired from the second and fourth cameras, respectively.

The second and fourth synthesis areas 303 and 307 may be generated (FIG. 6B) based on partial areas 335 and 337 of second and fourth images 323 and 327 (FIG. 6A) acquired from the second and fourth cameras 160b and 160d, respectively. In this case, the sizes of the second and fourth synthesis areas 303 and 307 may be smaller than the sizes of the second and fourth images 323 and 327, respectively.

A first boundary line 311 and a second boundary line 313 may be disposed at both ends of the second synthesis area 303. In other words, the second synthesis area 303 may be disposed between the first and second boundary lines 311 and 313.

In this case, the first boundary line 311 may have the same location as the first boundary line 311 disposed at one end of the first synthesis area 301, and the second boundary line 313 may have the same location as the second boundary line 313 disposed at one end of the third synthesis area 305.

A third boundary line 315 and a fourth boundary line 317 may be disposed at both ends of the fourth synthesis area 307. In other words, the fourth synthesis area 307 may be disposed between the third and fourth boundary lines 315 and 317.

The third boundary line 315 may have the same location as the third boundary line 315 disposed at the other end of the third synthesis area 305 and the fourth boundary line 317 may have the same location as the fourth boundary line 317 disposed at the other end of the first synthesis area 301.

Thus, the first synthesis area 301 and the second synthesis area 303 may be disposed adjacent to each other about the first boundary line 311, and the second synthesis area 303 and the third synthesis area 305 may be disposed adjacent to each other about the second boundary line 313.

In addition, the third synthesis area 305 and the fourth synthesis area 307 may be disposed adjacent to each other about the third boundary line 315 and the fourth synthesis area 307 and the first synthesis area 301 may be disposed adjacent to each other about the fourth boundary line 317.

Meanwhile, overlapping areas 331a, 331b, 333a, and 333b may be provided. The overlapping areas 331a, 331b, 333a, and 333b may be included in one of the adjacent synthesis areas. The overlapping areas 331a, 331b, 333a, and 333b may be subject overlapping areas and may refer to the overlapping areas in adjacent images acquired from a subject of adjacent cameras.

For example, the first overlapping area 331a may be included in the first synthesis area 301. When the second synthesis area 303 is changed so as to be enlarged, the first overlapping area 331a may be included in the second synthesis area 303.

In this manner, the first overlapping area 331a may be included in the first synthesis area 301 or the second synthesis area 303 depending on the situation.

For example, when the first overlapping area 331a is included in the second synthesis areas 303, the second synthesis area 303 may be enlarged and an object located in the second synthesis area 303 may not disappear so that the driver may easily recognize the movement of the object.

First Embodiment

Figure 7:
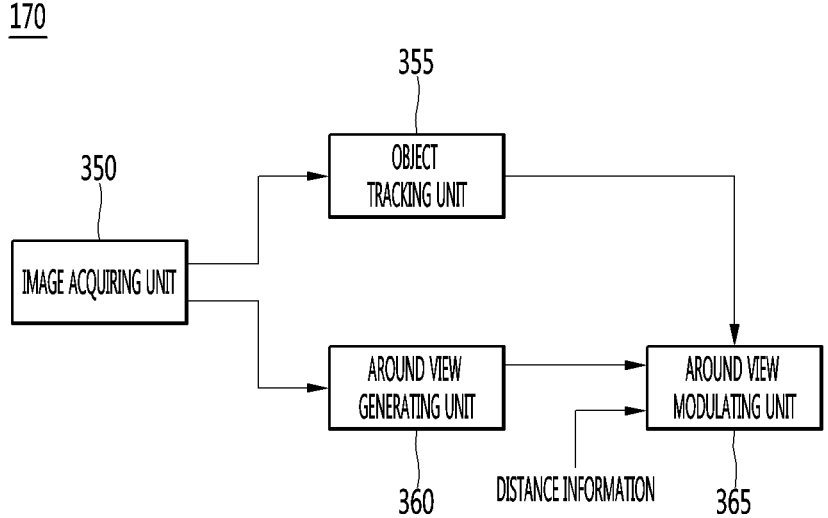
FIG. 7 is a block diagram showing a configuration of a processor of an apparatus for providing an around view according to an embodiment of the present invention.

FIG. 7 is a block diagram showing a configuration of a processor of an apparatus for providing an around view according to an embodiment.

Referring to FIG. 7, a processor 170 of an around view providing apparatus 100 according to an embodiment may include an image acquiring unit 350, an object tracking unit 355, an around view generating unit 360, and an around view modulating unit 365.

The image acquiring unit 350 may acquire digital images from first to fourth images 321, 323, 325, and 327 photographed by first to fourth cameras 160a, 160b, 160c, and 160d.

If the first to fourth cameras 160a, 160b, 160c and 160d are provided with a device for acquiring the digital images, the image acquiring unit 350 may be omitted.

The first to fourth images 321, 323, 325, and 327 acquired from the image acquiring unit 350 may be provided to the object tracking unit 355 and the around view generating unit 360.

The object tracking unit 355 may extract an object from the first to fourth images 321, 323, 325, and 327 acquired from the image acquiring unit 350.

The object may be a moving creature or a non-moving creature.

As an example, the object may be extracted as follows, but the embodiment is not limited thereto.

First, the distortion included in the first to fourth images 321, 323, 325, and 327 acquired from the image acquiring unit 350 may be corrected, an object feature may be acquired from the corrected first to fourth images 321, 323, 325, and 327 using an edge detection algorithm, and the object may be extracted based on the object feature.

As another example, a segment process may be performed in each of the images 321, 323, 325, and 327 based on disparity information to generate segment information where the background and the foreground are separated from each other. Then, the object may be extracted based on the segment information.

The object tracking unit 355 may not only extract the object, but also track the movement of the extracted object. The first to fourth images 321, 323, 325, and 327 that are photographed in real time may be composed of a plurality of frames. In order to track the movement of the object, for example, when the object is extracted from each frame, the change of the object between the frames may be tracked so that the movement of the object may be detected.

The movement route and the moving direction of the object may be recognized by tracking the movement of the object.

Accordingly, the object tracking unit 355 can generate object information related to the movement of the object. The object information may include an object location, a movement direction of the object, a movement route of the object, and the like.

Meanwhile, the around view generating unit 360 may generate the around view image including the first to fourth synthesis areas 301, 303, 305 and 307 based on the first to fourth images 321, 323, 325, and 327 acquired from the image acquiring unit 350. The first to fourth images 321, 323, 325, and 327 may be images acquired from the first to fourth cameras 160a, 160b, 160c, and 160d.

For this purpose, the around view generating unit 360 may access the memory 140 to read the synthesis information stored in the memory 140.

The around view generating unit 360 may generate the first to fourth synthesis areas 301, 303, 305, and 307 from the first to fourth images 321, 323, 325, and 327 based on the synthesis information and may generate the around view image by synthesizing the first to fourth synthesis areas 301, 303, 305, and 307 such that the first to fourth synthesis areas 301, 303, 305, and 307 are adjacent to each other about the first to fourth boundary lines 311, 313, 315, and 317.

The around view modulating unit 365 may modulate the around view image generated by the around view generating unit 360 based on the object information and distance information received from the object tracking unit 355.

The object information may include the location of the object, the movement direction of the object, the movement route of the object, and the like.

A method of modulating the around view will be described in detail with reference to FIG. 8.

The around view modulating unit 365 may recognize the movement of the object based on the object information generated from the object tracking unit 355.

The around view modulating unit 365 may predict in which direction of the vehicle 700 the object will approach and pass based on the object information. In contrast, when the vehicle 700 is in operation, it is possible to predict along which side of the vehicle 700 the object will pass.

Based on the above prediction, it can be predicted that the object such as a motorcycle will pass along the right side of the vehicle 700, as shown in FIGS. 8a to 8d.

When it is predicted that the object will pass along the right side of the vehicle 700, the around view modulating unit 365 can confirm the degree of approach of the object to the vehicle 700.

That is, for example, the around view modulating unit 365 can confirm the degree of the approach of the object based on the distance information inputted from the distance sensor 150.

Instead of using the distance sensor 150, the distance between the object and the vehicle 700 may be directly calculated from the first to fourth images 321, 323, 325, and 327 acquired from the first to fourth cameras 160a, 160b, 160c, and 160d, but the embodiment is not limited thereto.

The around view modulating unit 365 may modulate the around view image input from the around view generating unit 360 when the corresponding object approaches within a predetermined distance.

When the corresponding object approaches within the predetermined distance, the around view modulating unit 365 may operate in a change mode.

Figure 8A:
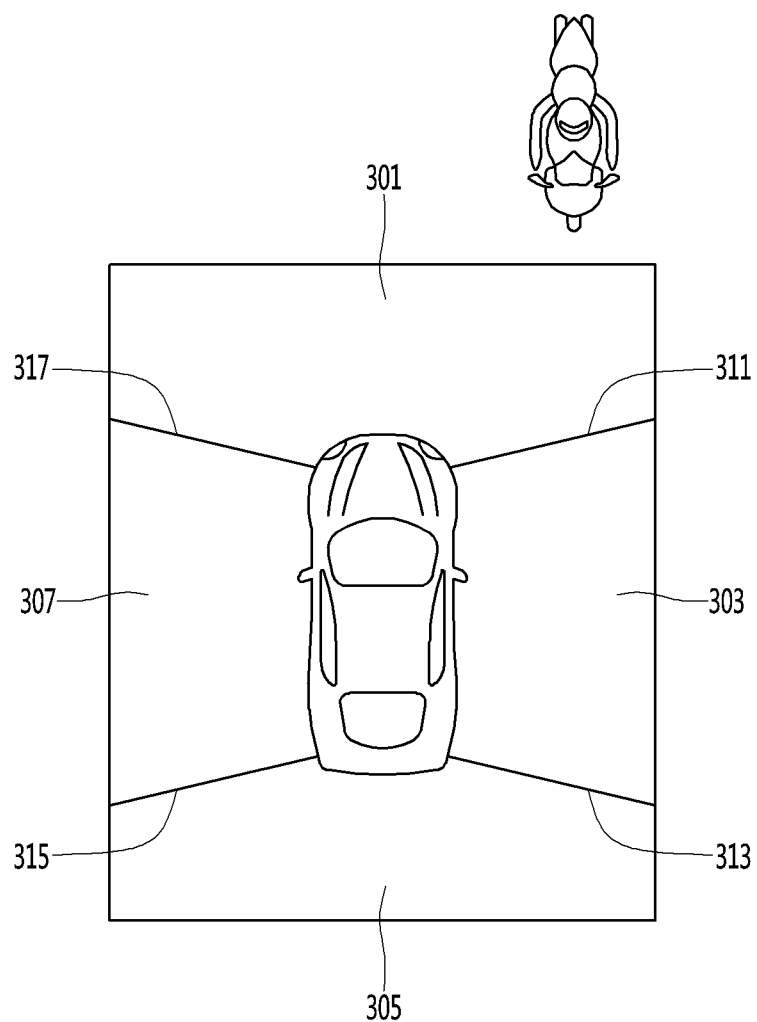
FIG. 8 is a view for explaining an around view modulation method according to an embodiment.

Specifically, as shown in FIG. 8a, when it is predicted that the object will approach within the predetermined distance and pass along the left side of the vehicle 700, locations of the first boundary line 311 and the second boundary line 313 may be changed to locations in the first synthesis area 301 and the third synthesis area 305 in the around view image.

Figure 8B:
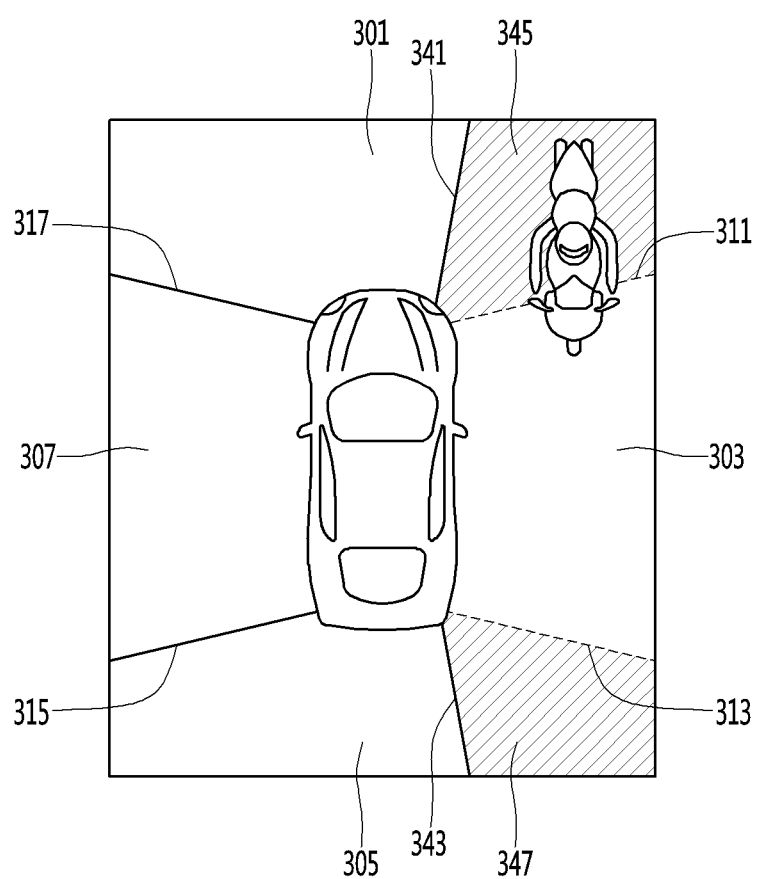

Therefore, as shown in FIG. 8b, another boundary line, that is, a first changed boundary line 341 may be set at a first location in the first synthesis area 301 instead of the first boundary line 311, and another boundary line, that is, a second changed boundary line 343 may be set at a second location in the second synthesis area 303 instead of the second boundary line 313. Due to the first and second boundary lines 311 and 313, which are newly set, the size of the second synthesis area 303 may be enlarged and the sizes of the first synthesis area 301 and the third synthesis area 305 may be reduced.

The first and second synthesis areas 301 and 303 disposed adjacent to each other about the first boundary line 311 may be disposed adjacent to each other about the first changed boundary line 341 that has been newly changed.

Similarly, the second and third synthesis areas 303 and 305 disposed adjacent to each other about the second boundary line 313 may be disposed adjacent to each other about the second changed boundary line 343 that has been newly changed.

In this case, an area between the first boundary line 311 and the first changed boundary line 341 may be a first overlapping area 345 which may be a part of the first synthesis area 301 or the second synthesis area 303.

In addition, an area between the second boundary line 313 and the second changed boundary line 343 may be a second overlapping area 347 which may be a part of the second synthesis area 303 or the third synthesis area 305.

The first changed boundary line 341 and the second changed boundary line 343 may coincide with both ends of an image, which correspond to the maximum wide angle of the second camera 160b, but the embodiment is not limited thereto.

Therefore, even if the second synthesis area 303 is enlarged to the first overlapping area 345 and the second overlapping area 347, since the second synthesis area 303 and the first and second overlapping areas 345 and 347 are generated from the second image 323 acquired from the second camera 160b, the continuity of the viewpoint may be maintained so that the objects belonging to the second synthesis area 303 and the first and second overlapping areas 345 and 347 may continuously maintain excellent image quality without being overlapped or disappearing.

Especially, since the first boundary line 311 and the second boundary line 313 are changed to another area where the object does not pass, it is possible to solve the conventional problem that the object is overlapped or disappears when the object passes through the first boundary line and the second boundary line.

Although FIG. 8b shows that the around view image is modulated such that the second synthesis area 303 is simultaneously expanded into the first and second overlapping areas 345 and 347, the embodiment is not limited thereto.

For example, when a motorcycle approaches within a predetermined distance from the vehicle 700, the second synthesis area 303 is enlarged to include the first overlapping area 345, and when the motorcycle enters the left side of the vehicle 700, the synthesis area may be enlarged to include the second overlapping area 347. The second synthesis area 303 may be enlarged to sequentially include the first overlapping area 345 and the second overlapping area 347.

Figure 8C:
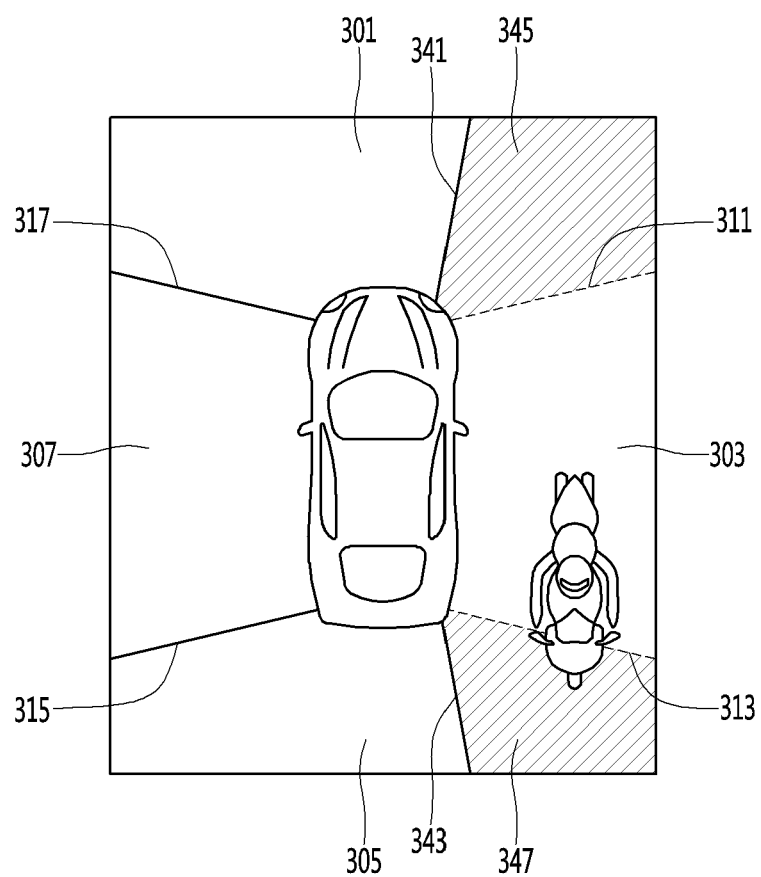

When the around view image is modulated as shown in FIG. 8b, the motorcycle may not disappear or be overlapped in the around view image while the motorcycle is passing through the right side of the vehicle 700 as shown in FIG. 8c.

Figure 8D:
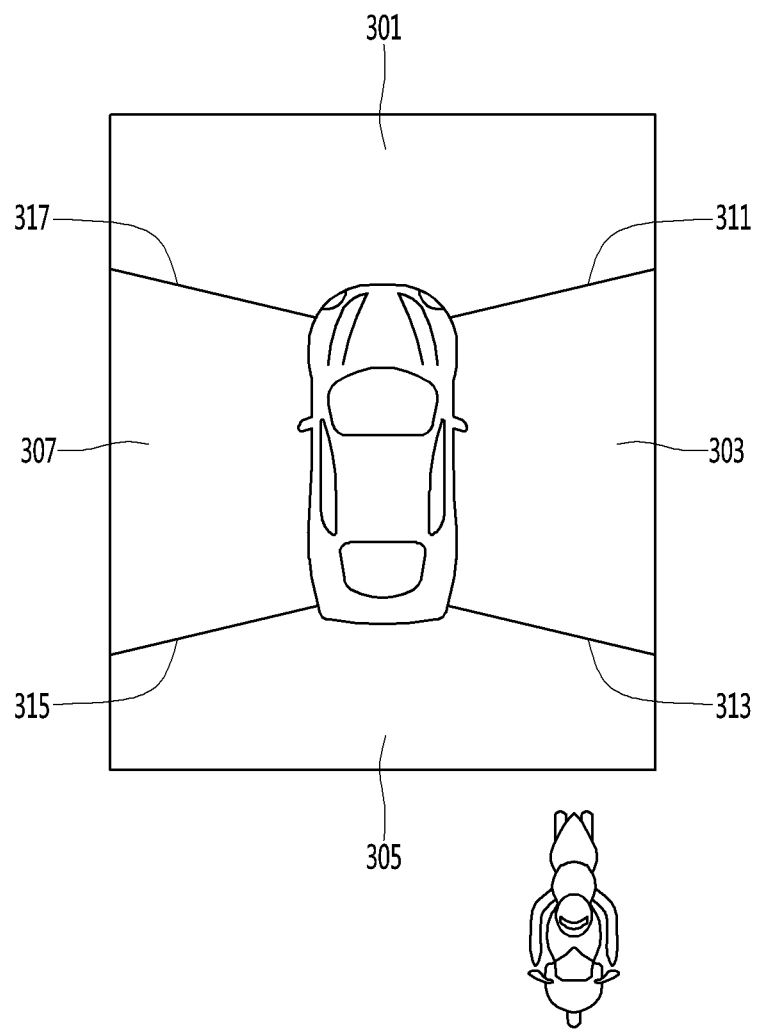

Meanwhile, when the motorcycle has passed to the rear of the vehicle 700 through the right side of the vehicle 700 as shown in FIG. 8d, the around view modulating unit 365 may recover the original around view image, but the embodiment is not limited thereto.

Specifically, the first and second changed boundary lines 341 and 343 may be reset to the first and second boundary lines 311 and 313, and the first to third synthesis areas 301, 303, and 305 may be generated about the first and second boundary lines 311 and 313 that have been reset so that the original around view image together with the fourth synthesis area 307 may be recovered.

Second Embodiment

The configuration of the processor 170 according to the second embodiment is the same as that shown in FIG. 7.

However, a method of modulating an around view according to the second embodiment is different from that of the first embodiment.

That is, according to the first embodiment, when the object approaches within a predetermined distance from the vehicle 700, the size of a specific synthesis area located in the travelling direction of the object may be enlarged to include an overlapping area located on both sides of the specific synthesis area. Thus, the object may pass on the specific synthesis area including the overlapping area acquired from the same camera.

In contrast, according to the second embodiment, when the object approaches within a predetermined distance from the vehicle, the size of the specific synthesis area located in the travelling direction of the object may be enlarged to include an overlapping area located on both sides of the specific synthesis area and the overlapping area may be gradually or sequentially changed from the specific synthesis area to an adjacent synthesis area based on the weight value of each of the specific synthesis area and the adjacent synthesis area.

In other words, the image may be changed from the image of the first synthesis area to the image of the second synthesis area for a predetermined period of time in a whole area unit of the overlapping area. For example, it is assumed that a predetermined time is divided into a unit of first to third times t1, t2, and t3. In this case, the entire overlapping area may be changed from the image of the first synthesis area to the image of the second synthesis area during the first time t1 within the predetermined time, the entire overlapping area may be changed from the image of the first synthesis area to the image of the second synthesis area during the second time t2 within the predetermined time, and the entire overlapping area may be changed from the image of the first synthesis area to the image of the second synthesis area during the third time t3 within the predetermined time.

Hereinafter, the second embodiment will be described in detail.

Weight values according to time in the synthesis areas 301, 303, 305, and 307 and the overlapping areas may be set in a weight map.

A modulated around view image (Iout (x, y)) calculated based on the weight values may be expressed as Equation 1.

$$I_{out}(x,y)=I_{fr}(x,y)\times\alpha(x,y)+I_{rg}(x,y)\times 1-\alpha(x,y))$$ [Equation 1]

In Equation 1, x, y represents coordinates of an image, I_fr and I_rg represent images of the first and second synthesis areas 301 and 303, respectively, and α (x, y) represents an average weight value.

Here, the average weight value may be expressed as Equation 2.

$$\alpha(x,y)=\alpha_1(x,y)\times 1-t)+\alpha_2(x,y)\times t$$ [Equation 2]

In Equation 2, α1(x, y) represents a weight value of the first synthesis area 301, α2(x, y) represents a weight value of the second synthesis area 303, and t represents time.

The average weight value may be a sum of the weight value of the first synthesis area 301 and the weight value of the second synthesis area 303, and time may be considered.

For example, when it is assumed that t varies in a unit of 0.1 second, the weight value according to Equation 2 is calculated every 0.1 second, and the calculated weight value is substituted into Equation 1 to acquire the modulated around view image in the adjacent synthesis areas and the overlapping area located therebetween.

As shown in the lower end portions of FIGS. 5A to 5e, at first, the overlapping area 345 may be generated as an image of the first synthesis area 301 generated by the first camera 160a. However, as time goes by, the overlapping area 345 may be generated as an image of the second synthesis area 303 generated by the second camera 160b rather than the image of the first synthesis area 301. Finally, the overlapping area 345 may be generated as an image of the second synthesis area 303 completely.

The second embodiment is different from the first embodiment in that the overlapping area 345 between adjacent synthesis areas is sequentially changed from the image of the first synthesis area 301 to the image of the second synthesis area 303 so that the image can be smoothly changed, thereby preventing the inconvenience such as unnatural feeling caused by abrupt change of the image.

Third Embodiment

Unlike the first and second embodiments, the third embodiment relates to a screen configuration when an object approaches at least two boundary lines.

Figure 9:
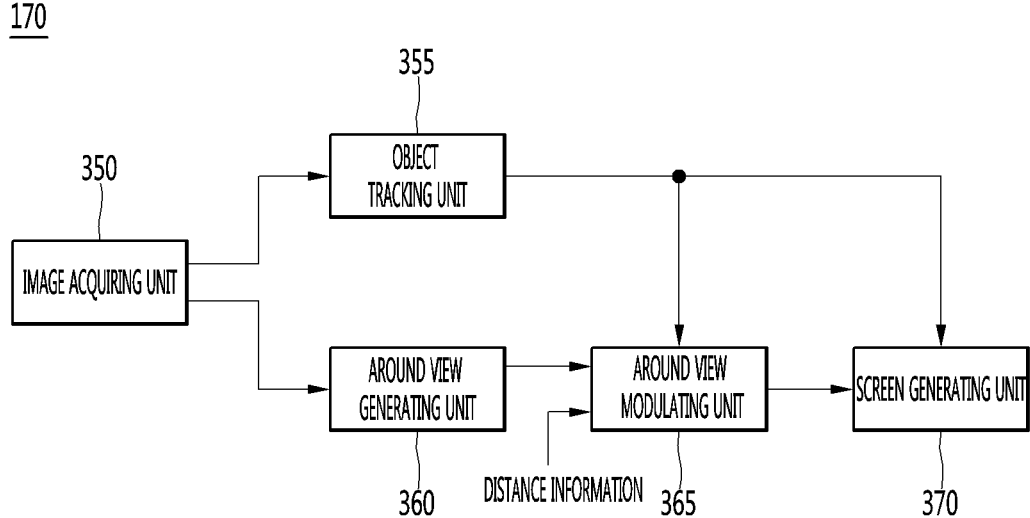
FIG. 9 is a block diagram showing a configuration of a processor according to another embodiment.

FIG. 9 is a block diagram showing a configuration of a processor according to another embodiment.

An image acquiring unit 350, an object tracking unit 355, an around view generating unit 360, and an around view modulating unit 365 shown in FIG. 9 are the same as those shown in FIG. 7 and have already been described, so a further explanation thereof will be omitted.

A screen generating unit 370 may configure a screen such that the modulated around view image input from the around view modulating unit 365 can be displayed on the display unit 180.

In addition, when a specific synthesized area is enlarged in the modulated around view image so that the boundary line is changed and another object is located on the changed boundary line so that the other object disappears, the screen generating unit 370 may display an image, which is acquired from a camera that photographs a portion where the other object is located, on a separate screen based on movement information of the object input from the object tracking unit 355 in order to clearly detect the movement of the other object.

Figure 10A:
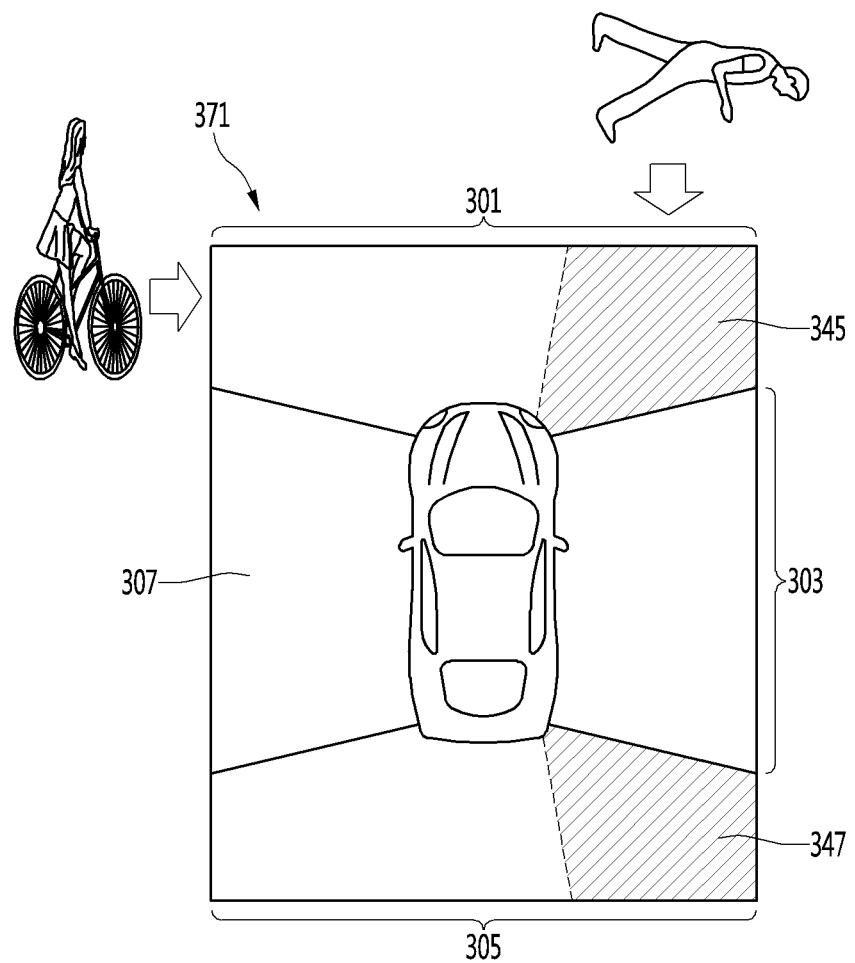
FIG. 10 is a view showing an example of a screen configuration related to an approach of a plurality of objects.

As shown in FIG. 10a, an around view image including the first to fourth synthesis areas 301, 303, 305, and 307 may be displayed on a first screen 371. The around view image may be displayed over the entire area of the first screen 371, but the embodiment is not limited thereto.

While the first screen 371 including the around view image is being displayed on the display unit 180, a first object, for example, a person may approach the vehicle from the forward side of the vehicle and walk along the right side of the vehicle and a second object, for example, a bicycle may run from the front left side to the right of the vehicle.

Figure 10B:
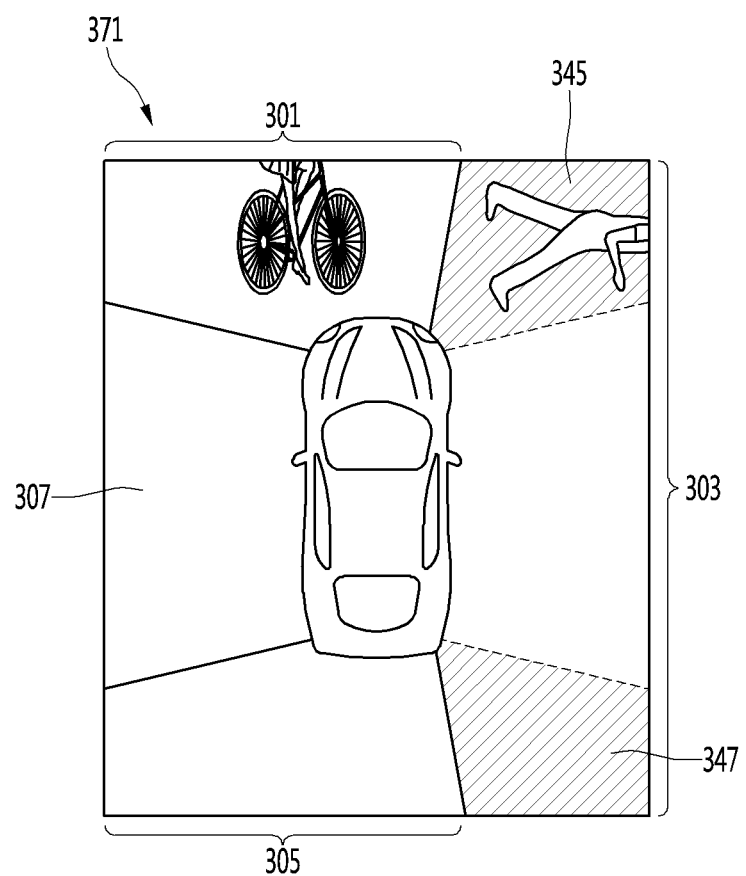

In this case, as shown in FIG. 10b, when it is predicted that the first object will pass along the right side of the vehicle, the processor 170 may generate the modulated around view image which is modified such that the second synthesis area 303 may include the first overlapping area 345 included in the first synthesis area 301 and the second overlapping area 347 included in the third synthesis area 305. The modulated around view image may be included in the first screen 371.

Thus, the second synthesis area 303 which is newly changed may have a size sufficient to include the first overlapping area 345 and the second overlapping area 347 as well as the second synthesis area 303, and the second synthesis area 303 and the first and second overlapping areas 345 and 347 may be generated from the second image 323 acquired by the second camera 160b. The details may be easily understood from the first embodiment and the second embodiment.

Figure 10C:
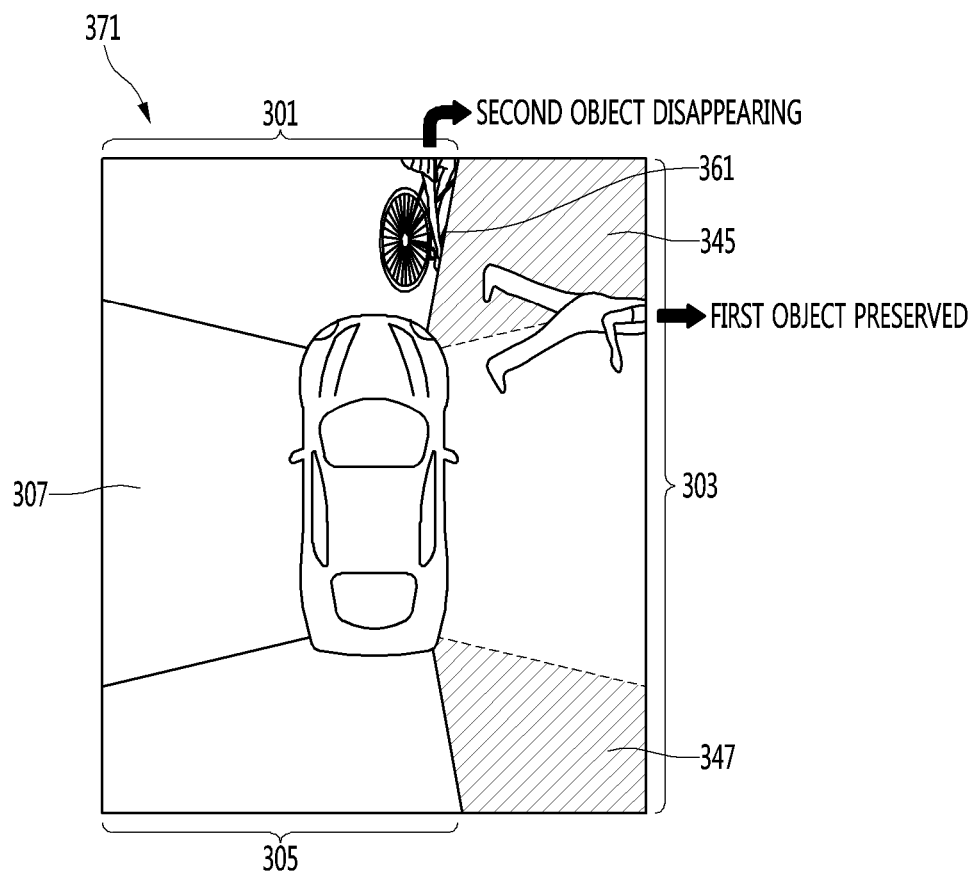

Therefore, the right side of the vehicle may be completely covered by the second synthesis area 303 which is newly changed so that the overlap or disappearance may not occur even if the first object passes along the right side of the vehicle as shown in FIG. 10c.

However, the second object may pass through a boundary line 361 between the second synthesis area 303, which is newly changed, and the first synthesis area 301 via the front side of the first vehicle, and the second object may disappear from the boundary line 361.

When the object is located on the boundary line 361 and the boundary line 361 cannot be changed, the screen generating unit 370 may divide the screen into at least one or more screens.

Figure 10D:
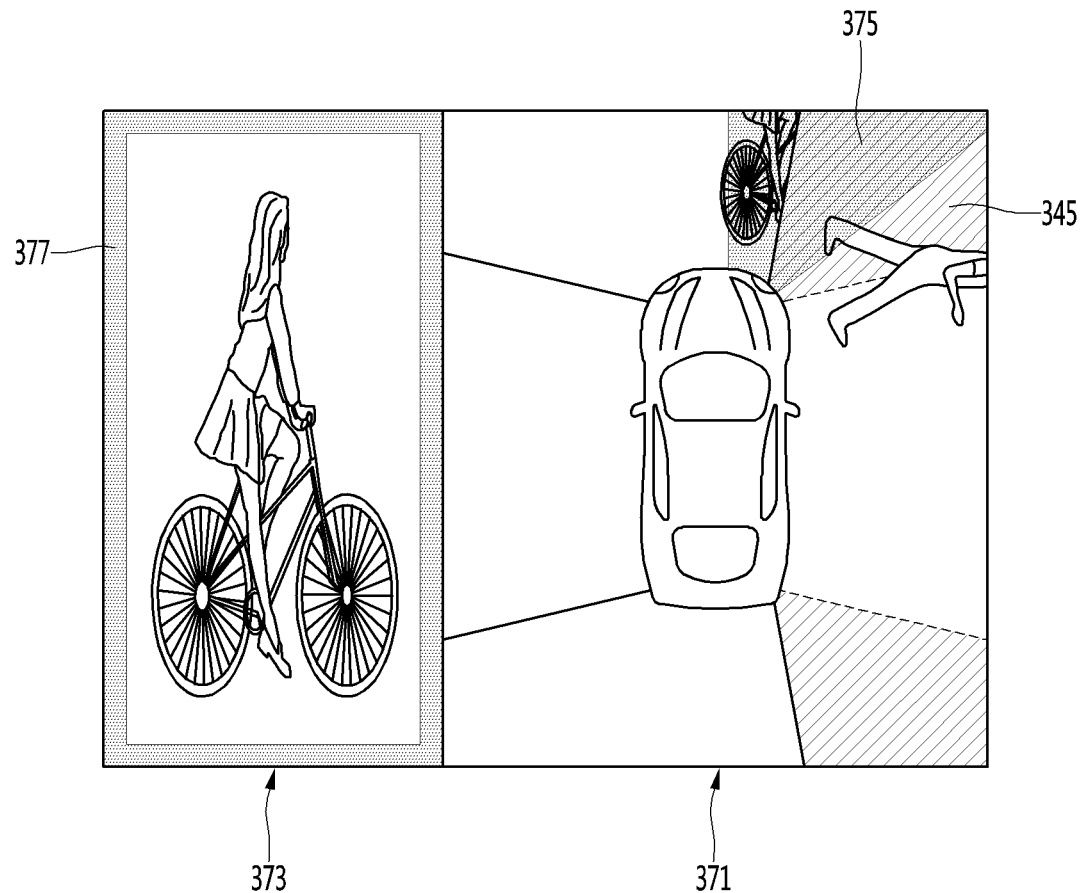

That is, as shown in FIG. 10d, the screen generating unit 370 may divide the screen into first and second screens 371 and 373 such that the first screen 371 may include the modulated around view image and the second screen 373 may include the first image 321 acquired from the forward camera, that is, the first camera 160a.

The first image 321 acquired from the first camera 160a may cover the first overlapping area 345 as well as the first synthesis area 301 of the modulated around view image.

Thus, when the first image 321 acquired from the first camera 160a is displayed on the second screen 373, the movement of the second object may be displayed on the second screen by the first image 321 acquired from the first camera 160a even if the second object disappears from the modulated around view image since the second object is located on the boundary line 361 of the modulated around view image. Accordingly, the driver may recognize the movement of the first object from the modulated around view image displayed on the first screen 371 and may recognize the movement of the second object from the first image 321 which is acquired by the first camera 160a and displayed on the second screen 373.

If another object is additionally located on another boundary line of the modulated around view image so that the other object disappears, a third screen (not shown) may be further provided to display an image acquired from the camera that photographs a portion where the other object is located.

Meanwhile, as shown in FIG. 10d, overlay areas 375 and 377 may be displayed to emphasize specific portions. The overlay areas 375 and 377 may be overlaid on existing images, but the embodiment is not limited thereto.

For example, a first overlay area 375 may be displayed on the first overlapping area 345 including the boundary line 361 of the modulated around view image in the first screen 371, and a second overlay area 377 may be displayed along an edge of the second screen 373 including the first image 321 acquired from the first camera 160a.

It is possible to induce the driver's attention through the overlay areas 375 and 377 so that the driver may more actively take necessary steps against an accident.

According to the embodiment, when at least two objects approach the vehicle, the movement of one object may be perfectly recognized by changing the specific synthesis area, but it is impossible to change the specific synthesis areas for the other objects. Thus, in the event that the object is located on the boundary line 361, an image acquired from the cameras 160a, 160b, 160c, and 160d capable of photographing a portion in the vicinity of the boundary line 361 may be displayed to specifically recognize the movement of the objects located on the corresponding boundary line 361 so that the movement of at least two objects may be easily recognized even if at least two objects approach the vehicle.

Fourth Embodiment

According to the fourth embodiment, a driver may recognize the change of the synthesis area of the around view image when the synthesized area of the around view image is changed.

Figure 11:
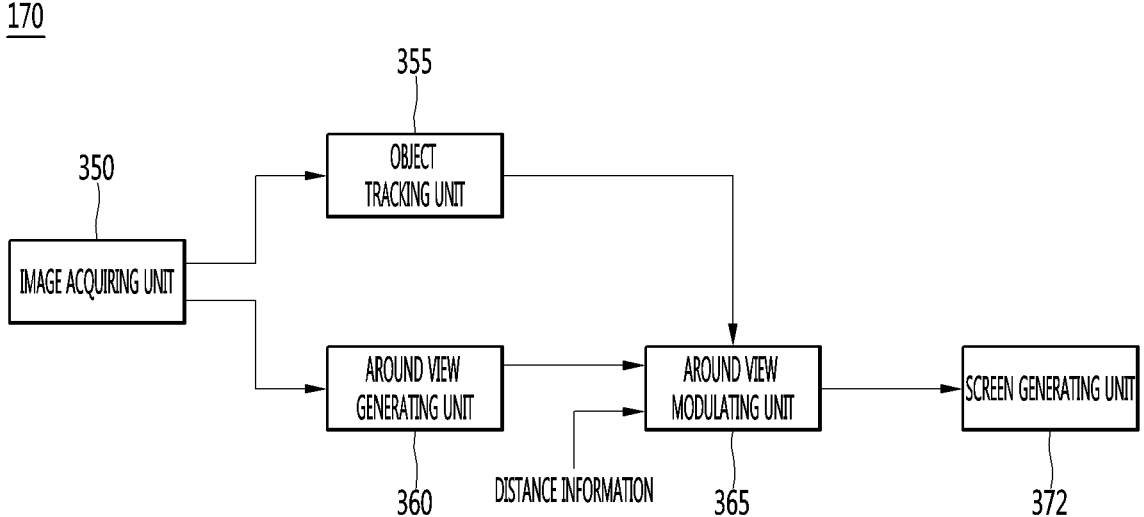
FIG. 11 is a block diagram showing a configuration of a processor according to still another embodiment.

FIG. 11 is a block diagram showing a configuration of a processor according to still another embodiment.

The components shown in FIG. 11 are the same as those shown in FIG. 7 except for a screen generating unit 372. Thus, the following description will be made while focusing on the screen generating unit 372.

The screen generating unit 372 may generate a screen including an identification bar capable of identifying the change of the synthesized area of the modulated around view image based on the modulated around view image input from the around view modulating unit 365.

Figure 12A:
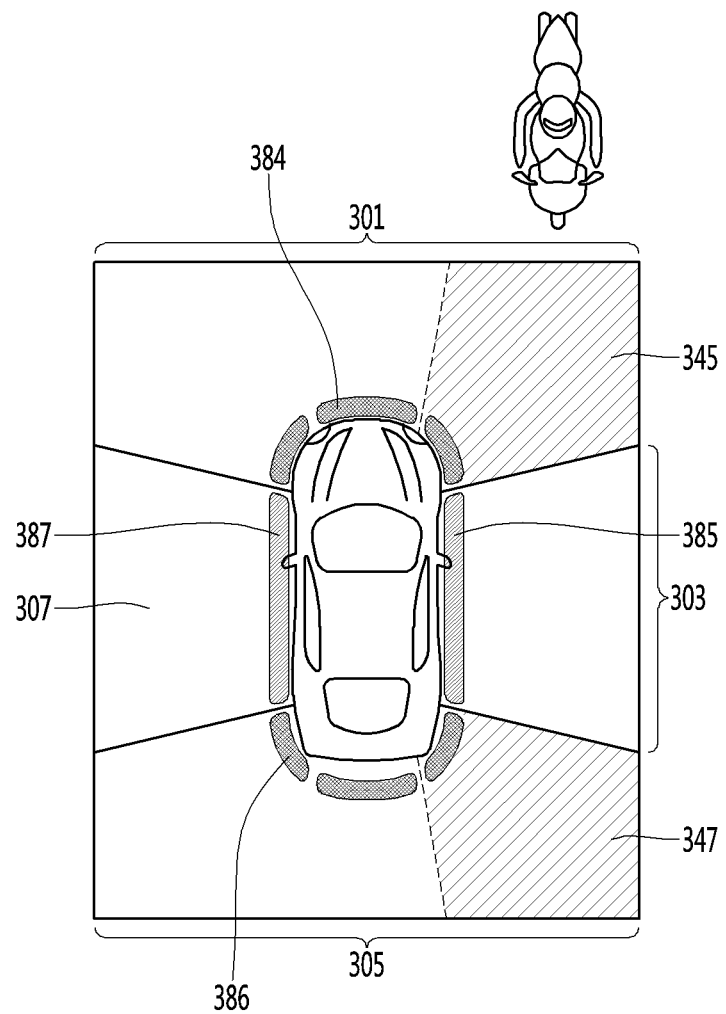
FIG. 12 is a view showing identification bars for identifying a change in each synthesis area when an around view image is modulated.

As shown in FIG. 12A, an around view image including the first to fourth synthesis areas 301, 303, 305, and 307 may be displayed on the screen in the normal mode. In this case, the around view image may be displayed together with identification bars 384, 385, 386, and 387 and a vehicle shape. The identification bars 384, 385, 386, and 387 may be disposed around the vehicle shape, but the embodiment is not limited thereto.

The identification bars may include a plurality of identification bars 384, 385, 386, and 387. The plurality of identification bars 384, 385, 386, and 387 may be provided as many as the first to fourth synthesis areas 301, 303, 305, and 307 included in the modulated around view image.

The first identification bar 384 may have a size corresponding to a size of the first synthesis area 301 of the around view image. The second identification bar 385 may have a size corresponding to a size of the second synthesis area 303 of the around view image. The third identification bar 386 may have a size corresponding to a size of the third synthesis area 305 of the around view image. The fourth identification bar 387 may have a size corresponding to a size of the fourth synthesis area 307 of the around view image.

Figure 12B:
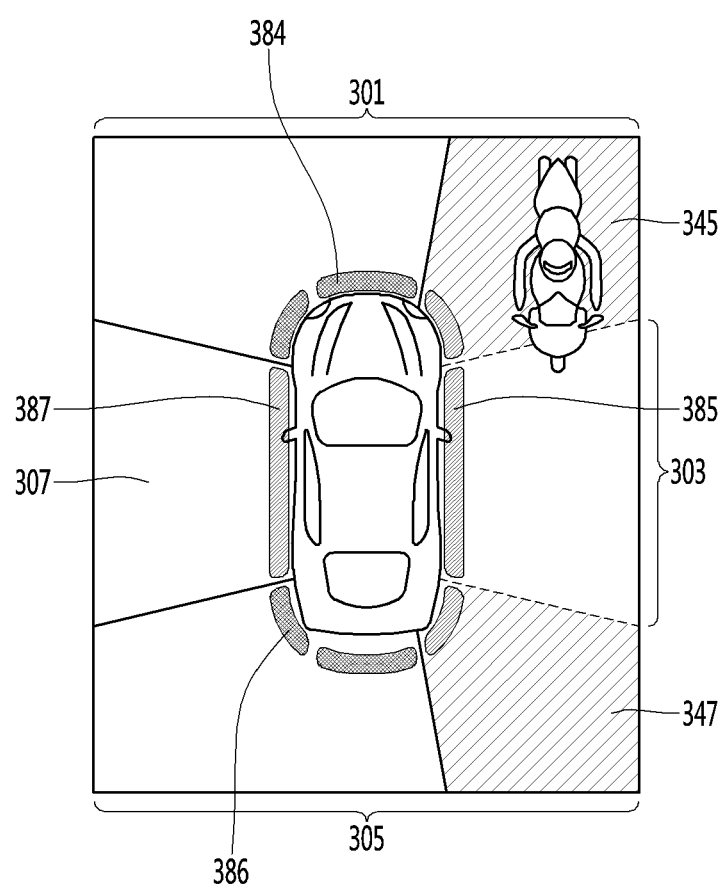

As shown in FIG. 12B, the around view image may be modulated due to the approach of the object so that the modulated around view image may be generated. That is, if it is predicted that the object will approach the vehicle and pass along the right side of the vehicle, the modulated around view image, in which the second synthesis area 303 is changed to include the first overlapping area 345 and the second overlapping area 347 in the around view image, may be generated.

Figure 12C:
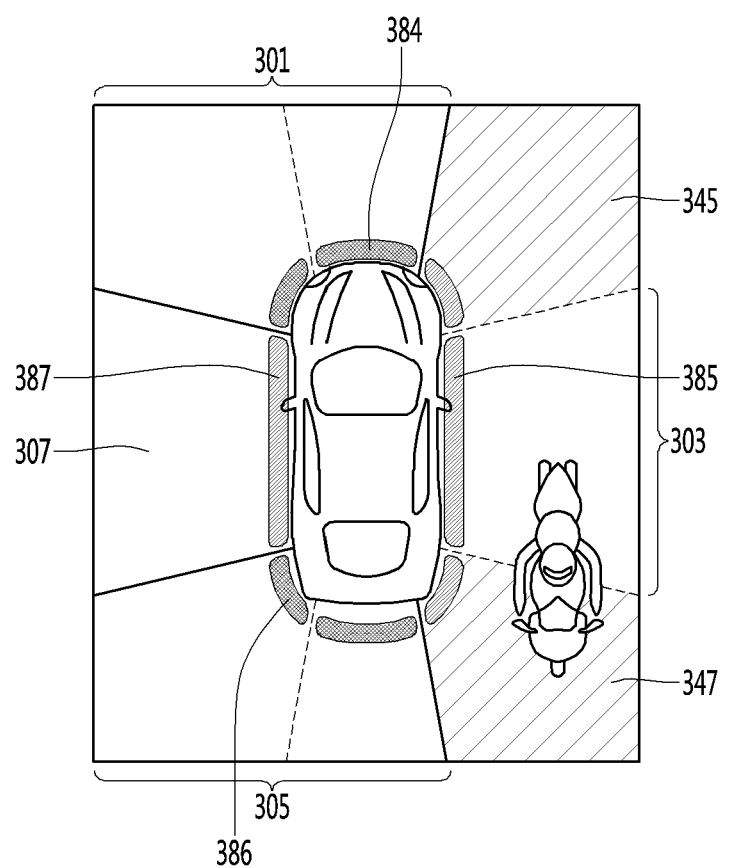

As shown in FIG. 12c, due to the modulated around view image, even if the object passes along the right side of the vehicle, it is possible to prevent the object from disappearing.

As shown in FIGS. 12B and 12c, the first synthesis area 301 and the third synthesis area 305 may also be changed corresponding to the change of the second synthesis area 303 in the modulated around view image.

When the first to third synthesis areas 301, 303, and 305 are changed, the first to third identification bars 384, 385, and 386 may also be changed corresponding to the change of the first to third synthesis areas 301, 303, and 305.

That is, the size of each of the first and third identification bars 384 and 386 may be reduced while the size of the second identification bar 385 is enlarged.

Figure 12D:
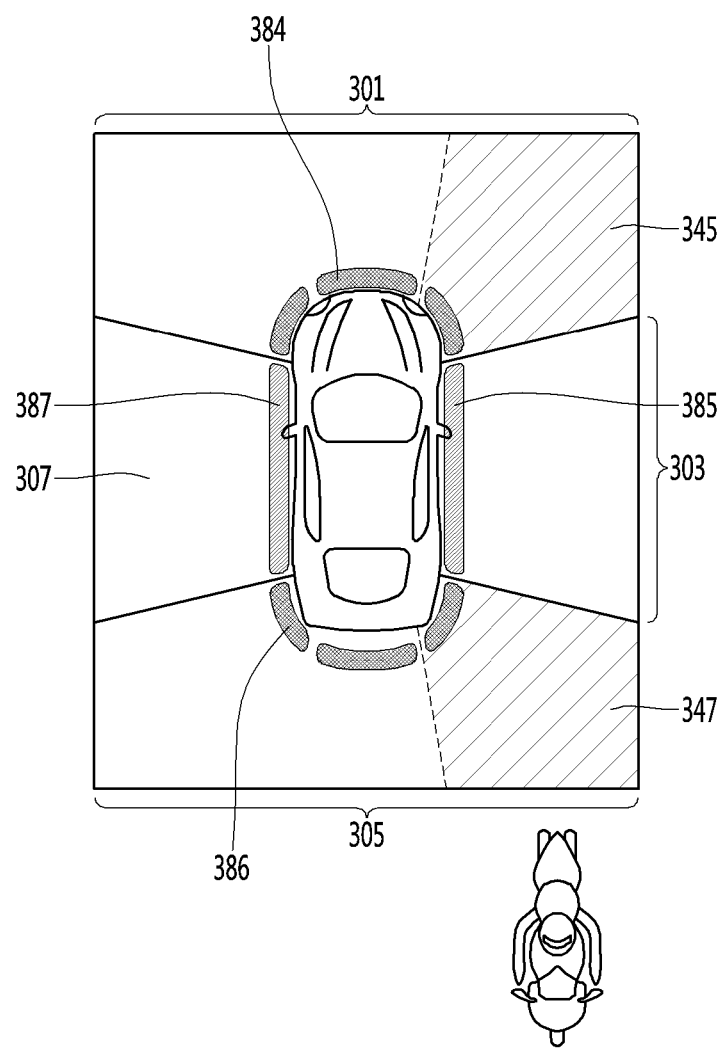

As shown in FIG. 12d, when the object has completely passed through the right side of the vehicle, a modulated object view image may be recovered to an original object view image. Accordingly, the sizes of the first to third identification bars 384, 385 and 386 may also be recovered to the original sizes.

Fifth Embodiment

The configuration of a processor 170 according to the fifth embodiment is the same as that shown in FIG. 9.

That is, unlike the first and second embodiments, the fifth embodiment relates to the screen configuration under the situation in which the boundary line of the around view image is not changed according to the approach of the object, for example, when the object approaches at least two boundary lines.

Figure 13:
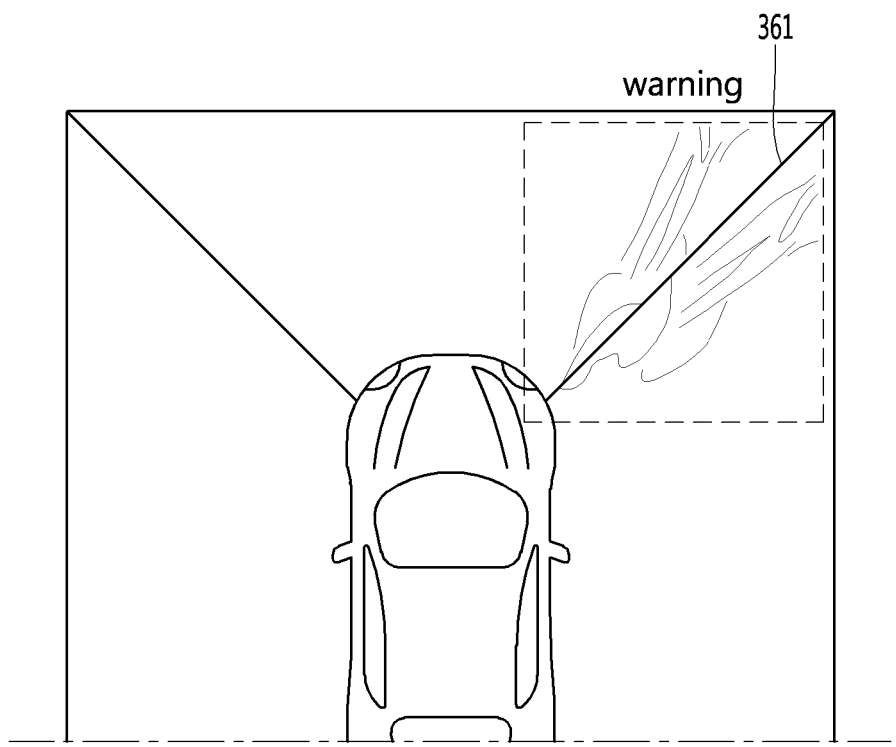
FIG. 13 is a view showing a processing procedure when an object is located at a boundary of each synthesis area of an around view image.

As shown in FIG. 13, when a specific object enters the boundary line 361 between the first and second synthesis areas 301 and 303 of the around view image from the forward side of the vehicle 700, the object may be overlapped or disappear due to the boundary line 361.

In this case, the driver may not recognize the object so that an accident may occur.

According to the fifth embodiment, the processor 170 may control to output a warning sound when a specific object enters a specific boundary line, that is, the boundary line 361 between the first and second synthesis areas 301 and 303. The warning sound may be output through the audio output unit 185 shown in FIG. 1.

As another example, the processor 170 may display an image in which the boundary line 361 or an area adjacent to the boundary line 361 is flashed when a specific object enters the boundary line 361.

Sixth Embodiment

The sixth embodiment is similar to the third embodiment (FIG. 10). That is, the sixth embodiment relates to the case in which when at least two objects approach the vehicle, the movement of one object may be perfectly recognized by changing the specific synthesis area, but it is impossible to change the specific synthesis areas for the other objects so that the object may be located on the boundary line, and moreover, a rearward image acquired from the third camera 160c is displayed on the screen because the vehicle runs rearward in the rearward running mode so that an additional screen may not be generated anymore.

Figure 14A:
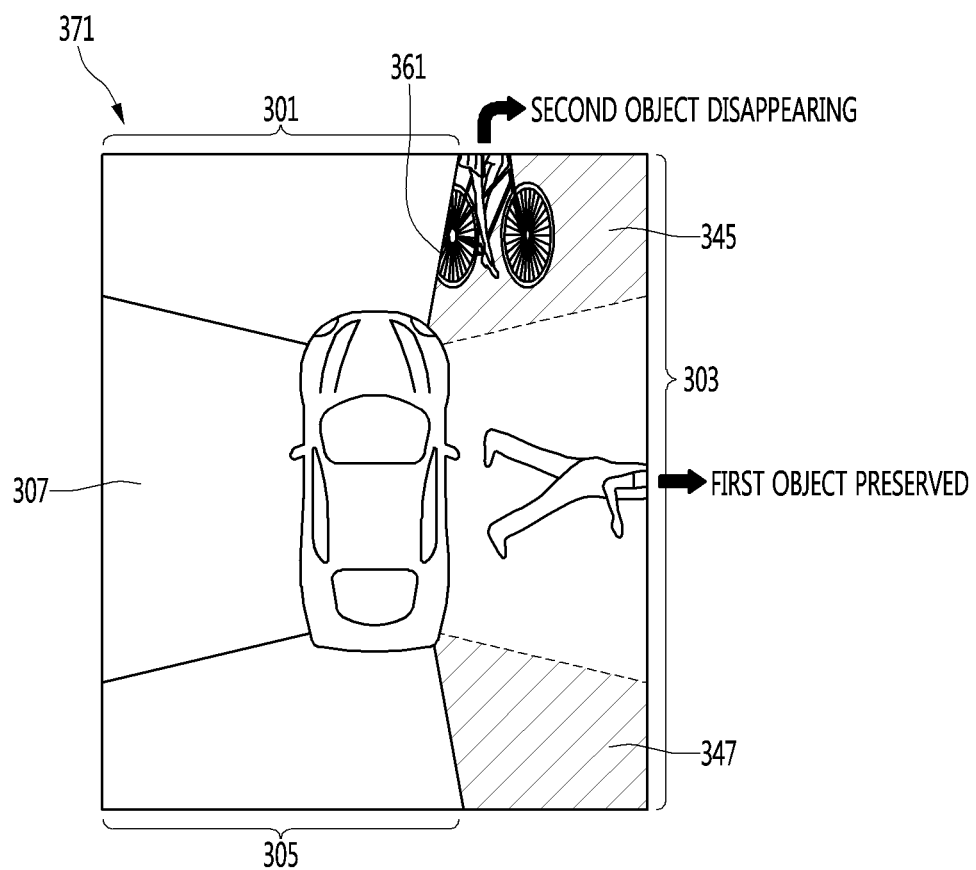
FIG. 14 is a view showing another example of a screen configuration related to an approach of a plurality of objects.

As shown in FIG. 14a, the second synthesis area 303 may be enlarged through the modulated around view image before a first object, such as a person, passes along the right side of the vehicle. Accordingly, it is possible to prevent the first object from disappearing from the modulated around view image even if the first object passes through the right side of the vehicle. The modulated around view image may be displayed through the first screen 371.

However, when a second object, for example, a bicycle is located on the boundary line 361 of the modulated around view image while moving toward the front of the vehicle, the second object may disappear from the modulated around view image.

According to the third embodiment, the first image 321 acquired from the first camera 160a may be directly displayed so that the movement of the second object that may disappear as described above can be clearly recognized.

Figure 14B:
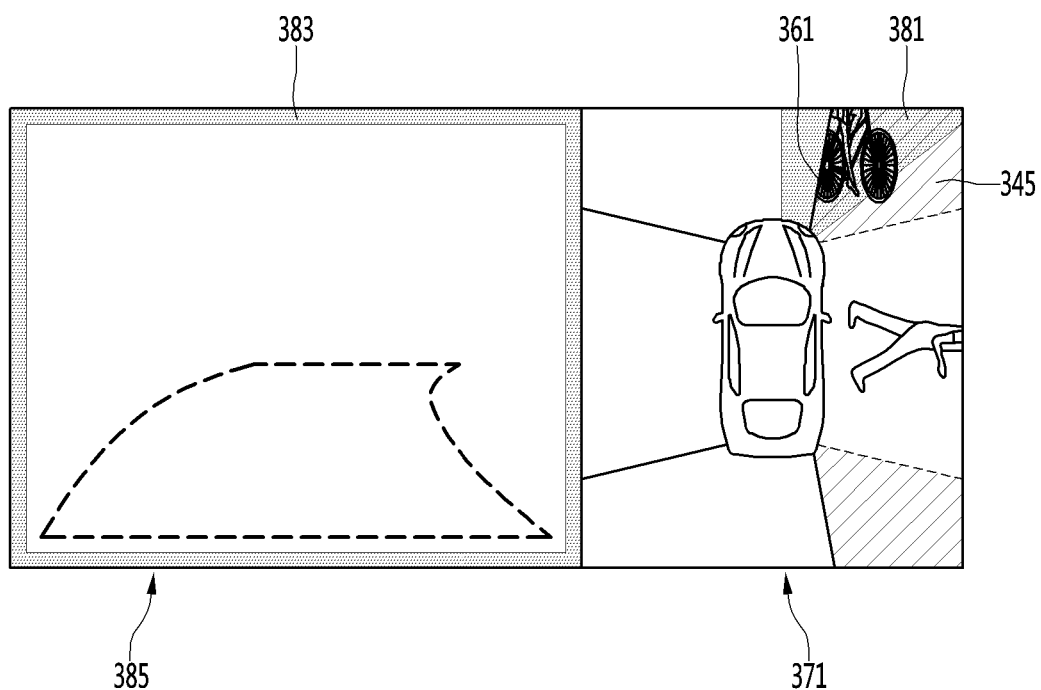

According to the sixth embodiment, as shown in FIG. 14b, the third image 325 acquired by the third camera 160c is displayed on a second screen 385 in the rearward running mode, so that an extra screen may not be available. That is, the screen of the display unit 180 may be divided into two screens 371 and 385 at maximum.

In this case, as shown in FIG. 14b, when the image related to the second object cannot be additionally displayed on the screen even though the second object disappears from the modulated around view image, the processor 170 may control to output a warning sound when the second object enters the boundary line 361. This warning sound may be output through the audio output unit 185 shown in FIG. 1.

The processor 170 may display a first overlay area 381 on a portion of the corresponding boundary line 361 and the first overlapping area 345. In addition, a second overlay area 383 may be displayed along an edge of the second screen 385 including the third image 325 acquired from the third camera 160c.

It is possible to induce the driver's attention through the overlay areas 381 and 383 so that the driver may more actively take necessary steps against an accident.

The foregoing detailed description is to be considered in all respects as illustrative and not restrictive. The scope of the present invention should be determined by rational interpretation of the appended claims, and all changes within the scope of equivalents of the present invention will fall in the scope of the present invention.

INDUSTRIAL APPLICABILITY

The embodiments may be applicable to fuel vehicles.

The embodiments may be applicable to environmentally friendly vehicles such as electric vehicles or hydrogen vehicles.

The embodiments may be applicable to future vehicles such as smart cars, connected cars, or autonomous vehicles.

The invention claimed is:

1. An apparatus for providing an around view, the apparatus comprising:
   first and second cameras configured to acquire first and second image information; and
   a processor,
   wherein the processor is configured:
      to generate an around view image including a first area including a subject overlapping area and a second area excluding the subject overlapping area based on first and second images, wherein the subject overlapping area is disposed between first and second boundary lines in the first and second images, the first boundary line is located in the first area, and the second boundary line adjoins the second area, and
      to generate the around view image in which the second area is changed to include the subject overlapping area, when it is predicted that a first object passes through the second boundary line due to an approach of the first object within a predetermined distance,
   wherein the processor comprises:
      an object tracking unit configured to extract at least one object from at least one of the acquired first and second images and to track movement of the extracted at least one object;
      an around view generating unit configured to generate the around view image including the first area and the second area based on the acquired first and second images, the first area including the overlapping area and the second area excluding the overlapping area;
      an around view modulating unit configured to generate a modulated around view image in which the second area is enlarged to include the overlapping area based on the movement and distance information of the tracked object; and
      a screen generating unit configured to generate a screen for displaying an image acquired from a camera that photographs a portion where a second object is located when the second area is enlarged to the first boundary line and the second object passes through the first boundary line in the modulated around view image.

2. The apparatus of claim 1, wherein, when the second area is enlarged to include an area corresponding to the subject overlapping area, the area corresponding to the subject overlapping area is excluded from the first area so that the first area is reduced.

3. The apparatus of claim 1, wherein the processor changes a location of the second boundary line to a location of the first boundary line to change the second area.

4. An apparatus for providing an around view, the apparatus comprising:
   first and second cameras configured to acquire first and second images; and
   a processor,
   wherein the processor is configured:
      to generate an around view image including a first synthesis area including an overlapping area and a second synthesis area excluding the overlapping area based on the acquired first and second images, wherein the overlapping area is located between first and second boundary lines, the first boundary line is located in the first synthesis area, and the second boundary line adjoins the second synthesis area, and
      to generate a modulated around view image in which the second synthesis area is enlarged to include the overlapping area and the overlapping area is excluded from the first synthesis area so that the first synthesis area is reduced, when it is predicted that a first object passes through the second boundary line due to an approach of the first object within a predetermined distance,
   wherein the processor comprises:
      an object tracking unit configured to extract at least one object from at least one of the acquired first and second images and to track movement of the extracted at least one object;
      an around view generating unit configured to generate the around view image including the first synthesis area and the second synthesis area based on the acquired first and second images, the first synthesis area including the overlapping area and the second synthesis area excluding the overlapping area;
      an around view modulating unit configured to generate a modulated around view image in which the second synthesis area is enlarged to include the overlapping area based on the movement and distance information of the tracked object; and
      a screen generating unit configured to generate a screen for displaying an image acquired from a camera that photographs a portion where a second object is located when the second synthesis area is enlarged to the first boundary line and the second object passes through the first boundary line in the modulated around view image.

5. The apparatus of claim 4, wherein the processor recovers the around view image in which the first synthesis area is enlarged to include the overlapping area when the first object has passed through the second boundary line.

6. The apparatus of claim 1, wherein the processor outputs a warning sound and displays an overlay area in a vicinity of the first boundary line of the modulated around view image when there is no screen for displaying the image acquired from the camera that photographs the portion where the second object is located even if the second synthesis area is enlarged to the first boundary line and the second object passes through the first boundary line.

7. The apparatus of claim 1, wherein the processor further comprises:
   a screen generating unit configured to generate a screen including a plurality of identification bars configured to identify whether the synthesis area of the modulated around view image is enlarged based on the generated modulated around view image; and
   a display unit configured to display the screen including the plurality of identification bars.

8. The apparatus of claim 7, wherein a plurality of synthesis areas are provided and the identification bars are disposed in the plurality of synthesis areas, respectively, to have an area corresponding to each area of the synthesis areas.

9. The apparatus of claim 4, wherein the processor changes from an image of the first synthesis area to an image of the second synthesis area for a predetermined time in a whole area unit of the overlapping area, when it is predicted that a first object passes through the second boundary line due to an approach of the first object within a predetermined distance.

10. The apparatus of claim 4, wherein the processor sequentially enlarges an entire area of the overlapping area from an image of the first synthesis area to an image of the second synthesis area for a predetermined time, when it is predicted that a first object passes through the second boundary line due to an approach of the first object within a predetermined distance.

11. The apparatus of claim 10, wherein the overlap region is enlarged by an average weight value indicating a time variable of a sum of a weight value of the first synthesis area and a weight value of the second synthesis area.

12. A method apparatus for providing an around view by using first and second cameras configured to acquire first and second images, the method comprising:
generating an around view image including a first synthesis area including an overlapping area and a second synthesis area excluding the overlapping area based on the acquired first and second images, wherein the overlapping area is located between first and second boundary lines, the first boundary line is located in the first synthesis area, and the second boundary line adjoins the second synthesis area, and
generating a modulated around view image in which the second synthesis area is enlarged to include the overlapping area and the overlapping area is excluded from the first synthesis area so that the first synthesis area is reduced, when it is predicted that a first object passes through the second boundary line due to an approach of the first object within a predetermined distance;
extracting at least one object from at least one of the acquired first and second images and to track movement of the extracted at least one object;
generating the around view image including the first synthesis area and the second synthesis area based on the acquired first and second images, the first synthesis area including the overlapping area and the second synthesis area excluding the overlapping area; and
generating a modulated around view image in which the second synthesis area is enlarged to include the overlapping area based on the movement and distance information of the tracked object;
generating a screen for displaying an image acquired from a camera that photographs a portion where a second object is located when the second synthesis area is enlarged to the first boundary line and the second object passes through the first boundary line in the modulated around view image.

13. The method of claim 12, further comprising:
recovering the around view image in which the first synthesis area is enlarged to include the overlapping area when the first object has passed through the second boundary line.

14. The method of claim 12, further comprising:
outputting a warning sound and displays an overlay area in a vicinity of the first boundary line of the modulated around view image when there is no screen for displaying the image acquired from the camera that photographs the portion where the second object is located even if the second synthesis area is enlarged to the first boundary line and the second object passes through the first boundary line.

15. The method of claim 12, further comprising:
generating a screen including a plurality of identification bars configured to identify whether the synthesis area of the modulated around view image is enlarged based on the generated modulated around view image; and
displaying the screen including the plurality of identification bars.

16. The method of claim 15, wherein a plurality of synthesis areas are provided and the identification bars are disposed in the plurality of synthesis areas, respectively, to have an area corresponding to each area of the synthesis areas.

* * * * *